US010371229B2

(12) United States Patent
Gandhi et al.

(10) Patent No.: US 10,371,229 B2
(45) Date of Patent: Aug. 6, 2019

(54) VIBRATION ISOLATOR MECHANISM WITH ADJUSTABLE FORCE-DEFLECTION CHARACTERISTICS

(71) Applicant: Toyota Motor Engineering & Manufacturing North America, Inc., Erlanger, KY (US)

(72) Inventors: Umesh N. Gandhi, Farmington Hills, MI (US); Ryohei Tsuruta, Ann Arbor, MI (US); Brian J. Pinkelman, Ann Arbor, MI (US); Rajendra Singh, Dublin, OH (US); Nicholas P. Mastricola, Columbus, OH (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/841,967

(22) Filed: Dec. 14, 2017

(65) Prior Publication Data

US 2019/0186588 A1 Jun. 20, 2019

(51) Int. Cl.
*F16F 1/32* (2006.01)
*F16F 15/123* (2006.01)

(52) U.S. Cl.
CPC .......... *F16F 15/12353* (2013.01); *F16F 1/32* (2013.01); *F16F 2228/004* (2013.01); *F16F 2228/063* (2013.01); *F16F 2228/066* (2013.01)

(58) Field of Classification Search
CPC .... F16F 1/32; F16F 1/322; F16F 1/324; F16F 1/328; F16F 2230/0005; F16F 2228/063; F16F 2228/066
See application file for complete search history.

(56) References Cited

U.S. PATENT DOCUMENTS

| 3,430,942 A * | 3/1969 | MacGlashan, Jr. ....... F16F 1/32 |
| | | 267/162 |
| 3,574,347 A * | 4/1971 | Hughes .................... F16F 1/32 |
| | | 267/162 |

(Continued)

FOREIGN PATENT DOCUMENTS

| CN | 202811955 | 3/2013 |
| JP | 2011201378 | 10/2011 |

OTHER PUBLICATIONS

Le, Thanh Danh & Ahn, Kyoung Kwan, "A vibration isolation system in low frequency excitation region using negative stiffness structure for vehicle seat", Journal of Sound and Vibration 330 ( 2011) 6311-6335.

(Continued)

*Primary Examiner* — Nicholas J Lane
(74) *Attorney, Agent, or Firm* — Christopher G. Darrow; Darrow Mustafa PC

(57) ABSTRACT

An adjustable vibration isolator for limiting transfer of vibrations from a first element to a second element coupled to the first element. The isolator includes conical disc spring members, each having a first end including a central opening, a central axis, and a second end opposite the first end. The second end includes an outer edge of the spring member. A spacer is coupled to each spring member so as to enable a transfer of forces between the spring member and the spacer. Spring member deflection resistance mechanisms are operable to adjustably resist movement of the outer edges of the spring members in directions radially outwardly during loading of the spring members. Resistance of movement of the outer edges of the spring members enables control of a force required to deflect the spring members, and control of the force-deflection curve of the vibration isolator.

17 Claims, 17 Drawing Sheets

(56) References Cited

U.S. PATENT DOCUMENTS

| | | | |
|---|---|---|---|
| 3,743,266 A | 7/1973 | Sturman et al. | |
| 3,873,079 A * | 3/1975 | Kuus | F16F 1/32 267/162 |
| 4,168,101 A | 9/1979 | DiGrande | |
| 4,215,841 A | 8/1980 | Herring, Jr. | |
| 4,351,556 A | 9/1982 | Worringer | |
| 4,530,491 A | 7/1985 | Bucksbee et al. | |
| 5,222,709 A | 6/1993 | Culley, Jr. et al. | |
| 5,669,598 A * | 9/1997 | Ticey | F16F 1/32 267/162 |
| 7,152,839 B2 | 12/2006 | Mullinix et al. | |
| 9,394,950 B1 * | 7/2016 | Henry | F16F 1/324 |
| 2007/0138720 A1 * | 6/2007 | Evans | F16F 1/32 267/162 |
| 2012/0018577 A1 * | 1/2012 | Quiroz-Hernandez | B64D 27/26 244/54 |
| 2016/0068085 A1 | 3/2016 | Mindel et al. | |
| 2018/0195570 A1 * | 7/2018 | Churchill | F16F 1/22 |
| 2018/0195571 A1 * | 7/2018 | Churchill | F16F 1/22 |
| 2018/0312086 A1 * | 11/2018 | Meingast | B60N 2/64 |

OTHER PUBLICATIONS

Lee, C.M. & Goverdovskiy, V.N., "A multi-stage high-speed railroad vibration isolation system with "negative" stiffness", Journal of Sound and Vibration 331 (2012) 914-921.

Lee, et al., "Position control of seat suspension with minimum stiffness", Journal of Sound and Vibration 292 (2006) 435-442.

Carella et al., "Demonstrator to show the effects of negative stiffness on the natural frequency of a simple oscillator", JMES (2008) Proceedings of the Institution of Mechanical Engineers, Part C: Journal of Mechanical Engineering Science, vol. 222 (7), pp. 1189-1192.

Le, Thanh Dahn & Ahn, Kyoung Kwan "Experimental investigation of a vibration isolation system using negative stiffness structure", International Journal of Mechanical Sciences (2013) International Journal of Mechanical Sciences 70 (2013) 99-112.

* cited by examiner

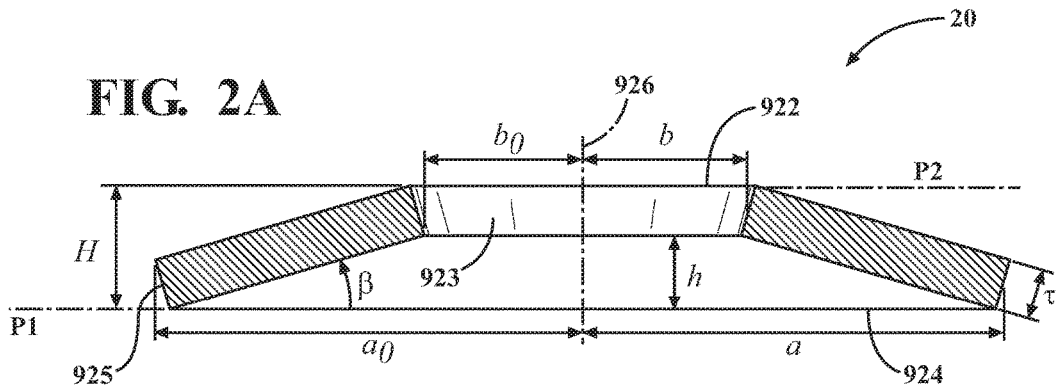
FIG. 2A
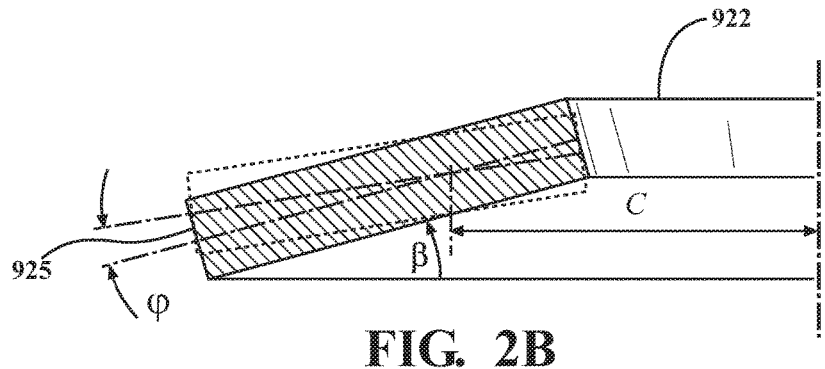
FIG. 2B
FIG. 2C
| Symbol | Standard Parameters | Symbol | Standard Parameters |
|---|---|---|---|
| $a_0$ | Outer radius | $a$ | Mid-surface outer radius |
| $b_0$ | Inner radius | $b$ | Mid-surface inner radius |
| $H$ | Spring Height | $c$ | Neutral circle redius |
| $\tau$ | Shell thickness | $h$ | Initial cone height |
| | | $\beta$ | Initial cone angle |
| | | $\varphi$ | Rotational deflection |
| | | $\delta$ | Linear deflection |

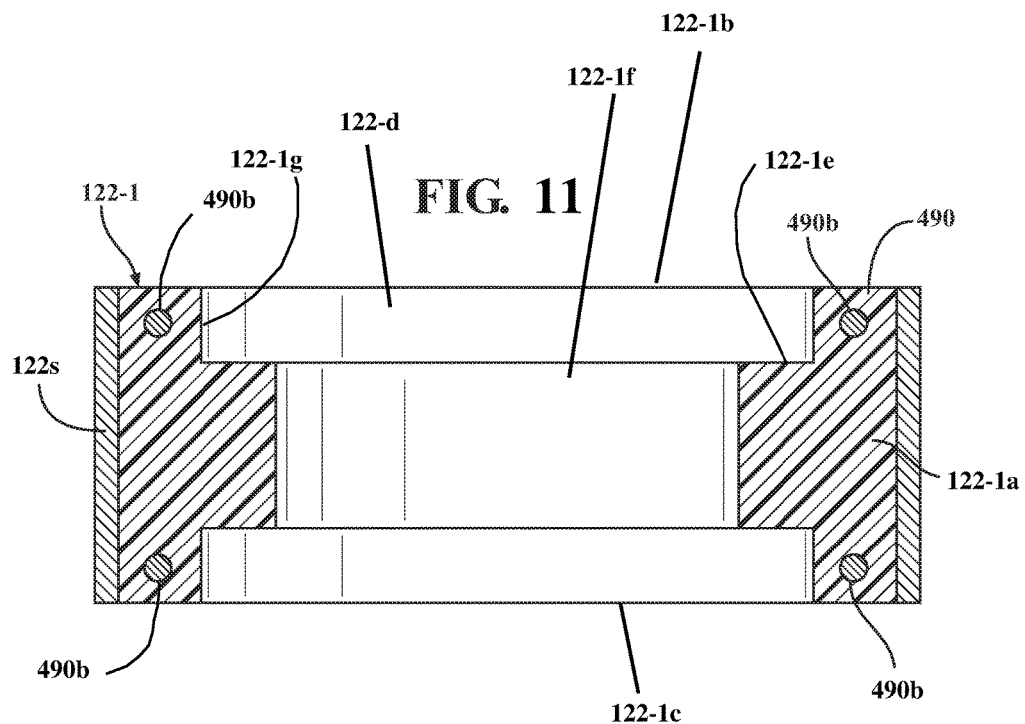
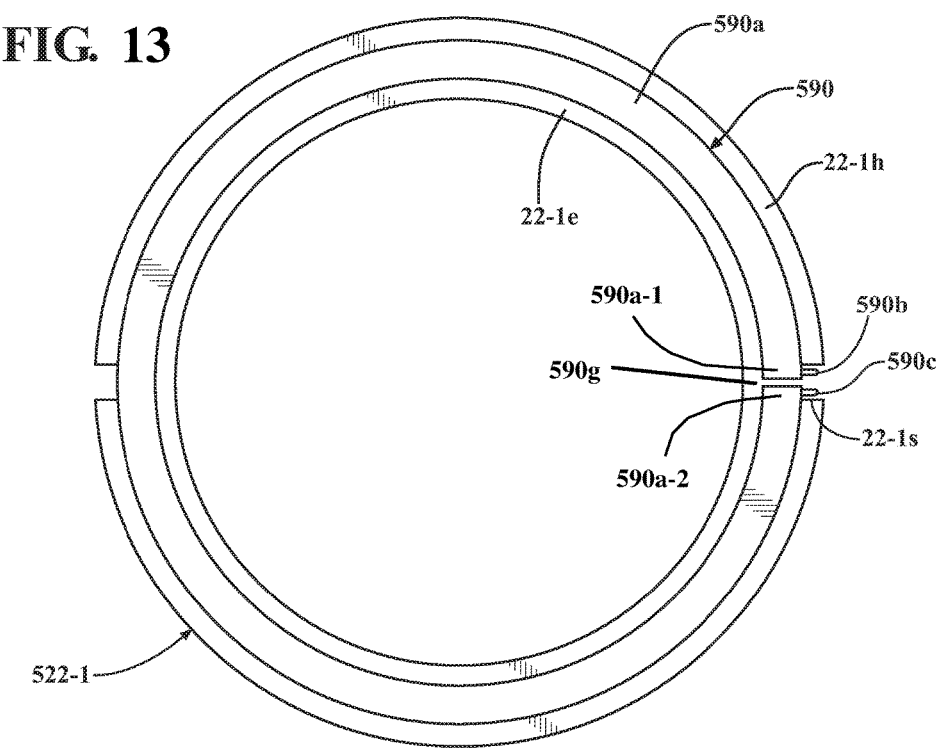

VIBRATION ISOLATOR MECHANISM WITH ADJUSTABLE FORCE-DEFLECTION CHARACTERISTICS

TECHNICAL FIELD

The present invention relates to systems and mechanisms in vehicles for preventing transmission of vibrations and forces causing vibrations from one portion of a vehicle to another portion of the vehicle.

BACKGROUND

It has been found that low frequency vibrations (in the range 0-10 Hz) experienced by a vehicle traveling along a road surface can be especially irritating to vehicle occupants. Forces resulting from these vibrations may be transmitted from the vehicle chassis to seats where the occupants are sitting. It can be difficult to isolate the passenger seats from these vibrations. Currently-used methods of isolating vehicle seats from such vibrations may be complex and expensive.

SUMMARY

In one aspect of the embodiments described herein, an adjustable vibration isolator is structured for limiting transfer of vibrations from a first element to a second element coupled to the first element. The vibration isolator includes at least one conical disc spring member having a first end including a central opening of the at least one conical disc spring member, and a second end opposite the first end. The second end includes an outer edge of the at least one conical disc spring member. The at least one conical disc spring member also has a central axis. At least one spacer is coupled to the at least one conical disc spring member so as to enable a transfer of forces between the at least one conical disc spring member and the at least one spacer. A spring member deflection resistance mechanism is coupled to the at least one spacer and is structured to be operable to adjustably resist movement of the outer edge of the at least one conical disc spring member in directions radially outwardly with respect to the central axis during application of a force to the least one conical disc spring member tending to deflect one of the at least one conical disc spring member first end and second end toward the other one of the at least one conical disc spring member first end and second end. Application of this resistance enables control of a force required to deflect the one of the at least one conical disc spring member first end and second end toward the other one of the at least one conical disc spring member first end and second end.

In another aspect of the embodiments described herein, a method of controlling force-deflection characteristics of a vibration isolator to an applied load is provided. The method includes steps of providing a vibration isolator incorporating an arrangement of conical disc spring members structured to provide quasi-zero/negative force-deflection response of the isolator to a force applied to the vibration isolator when the applied force is within a predetermined range; providing one or more spring member deflection resistance mechanisms structured to be operable to adjustably resist deflection of each conical disc spring member during application of the force to the vibration isolator, so as to control the range of forces over which the arrangement of conical disc spring members provides the quasi-zero/negative force-deflection characteristics; and, responsive to a magnitude of the applied force, operating the one or more spring member deflection resistance mechanisms to resist deflection of the spring members during loading so as to control the range of forces over which the arrangement of conical disc spring members provides the quasi-zero/negative force-deflection response, such that the magnitude of the applied force is within the range of forces.

BRIEF DESCRIPTION OF THE DRAWINGS

FIG. 2A is a schematic cross-sectional view showing the structure and pertinent parameters and design dimensions of a conical disc spring member in accordance with embodiments described herein.

FIG. 2B is a magnified view of a portion of the conical disc spring member shown in FIG. 2A, showing additional pertinent parameters.

FIG. 2C shows tables identifying the pertinent parameters shown in FIGS. 2A and 2B.

FIG. 11 is a schematic cross-sectional view of a spacer structure in accordance with an alternative embodiment described herein.

FIG. 13 is a schematic plan view of a spacer structure in accordance with an alternative embodiment described herein.

DETAILED DESCRIPTION

Figure 1:
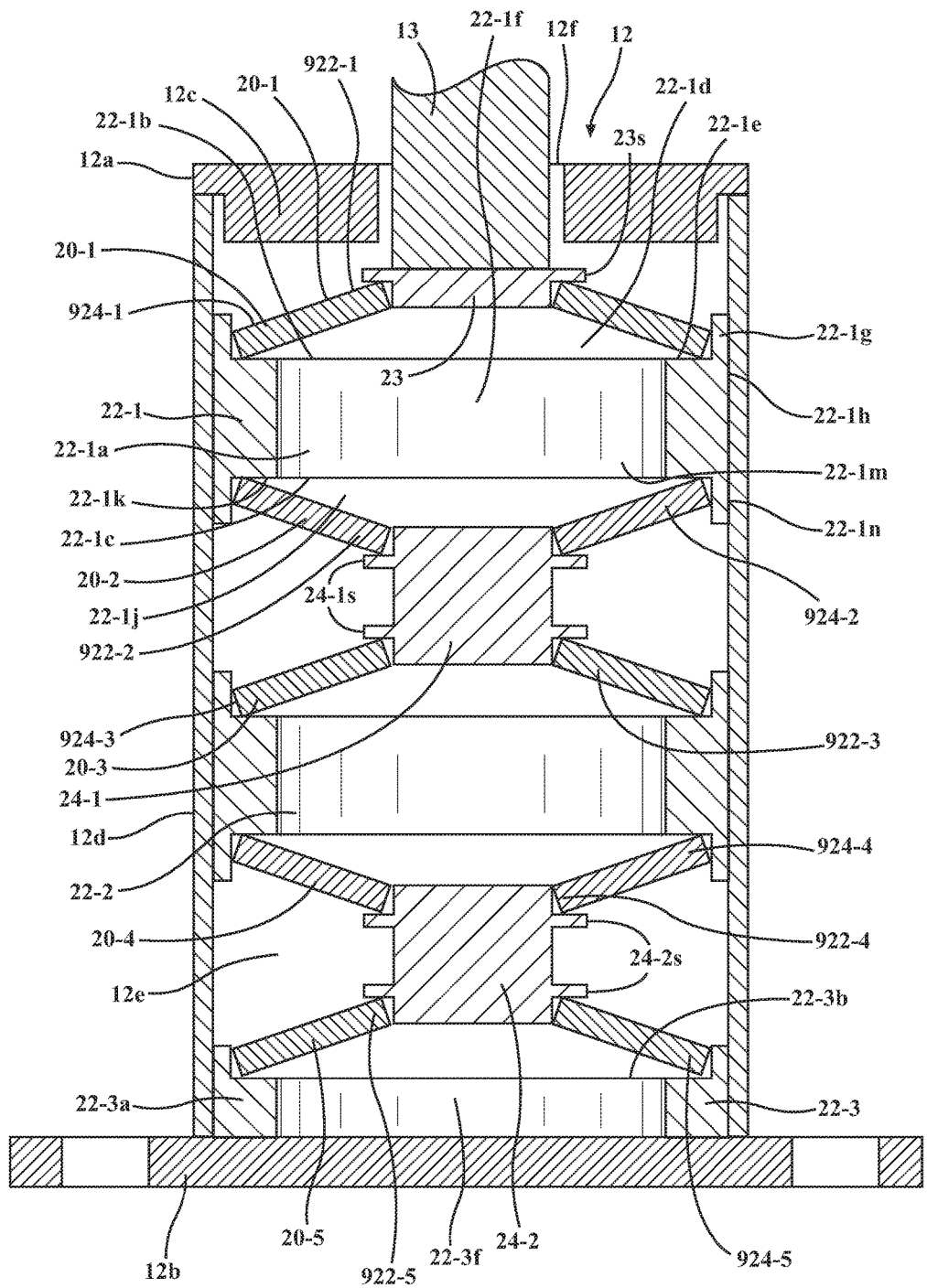
FIG. 1 shows a schematic side cross-sectional view of one embodiment of a vibration isolator in accordance with an embodiment described herein.

Embodiments described herein relate to an adjustable vibration isolator for limiting transfer of vibrations from a first element to a second element coupled to the first element. In one example, the first element may be a chassis of a vehicle and the second element may be a seat assembly of the vehicle. The adjustable vibration isolator may include an arrangement of coaxially-aligned conical disc spring members. Each spring member has a first end including a central opening, a second end opposite the first end, and a central axis. Each spring member second end also includes an outer edge of the spring member. Forces applied to the vibration isolator are transferred to the spring members. The arrangement of spring members is structured to provide a quasi-zero/negative stiffness response to a force applied to the vibration isolator when the applied force is within a predetermined range. This response enables the isolator to attenuates or absorb the forces applied to the isolator by the first element. The vibration isolator also includes one or more spacers coupled to the spring members so as to enable a transfer of forces between the spring member and the spacer. Spring member deflection resistance mechanisms are coupled to the spacers and are operable to adjustably resist movement of the outer edge of each conical disc spring member in directions radially outwardly with respect to the spring member central axis, during application of a force to the spring member tending to deflect the spring member. Resisting radially outward movement of the outer edges of the spring members during loading controls the force required to deflect the spring members. By controlling the forces required to deflect the spring members, the force deflection characteristics of the isolator may be shifted so that the force applied by the first element to the isolator falls within the range of forces over which the isolator provides a quasi-zero/negative stiffness response.

FIGS. 1 and 4A-4C show schematic side cross-sectional views of one embodiment of a vibration isolator (generally designated 12) in accordance with an embodiment described herein. The vibration isolator 12 may be structured and positioned for limiting transfer of vibrations from a first element to a second element coupled to the first element. The vibration isolator 12 may be interposed between elements of a system or mechanism to vibrationally isolate the elements from each other, so that transmission of vibrations experienced by a first element of the system or mechanism to a second element of the system or mechanism is attenuated or eliminated. For example, in the embodiment shown in FIGS. 4A-4C, the vibration isolator 12 is incorporated into a vehicle so as to help isolate a second element 14 (for example, a vehicle seat assembly) from vibrations experienced by a first element 16 (for example, a vehicle chassis) during movement of the vehicle along a road surface. Thus, the vibration isolator 12 may limit transfer of vibrations from a first element to a second element coupled to the first element.

Although the design and operation of the vibration isolator embodiments disclosed herein have been described as applied to a vehicle seat assembly, design particulars of an isolator structure described herein may be adapted to isolate or insulate numerous types of mounted mechanisms or elements from vibrations experienced by mounting structures to which the mounted mechanisms or elements are mounted or attached, and a vibration isolator structured in accordance with the principles described herein may be employed in a variety of other applications. For example, vehicle engines and transmission differentials may be vibrationally isolated from a vehicle frame. Non-vehicle applications may include mounting systems for equipment in manufacturing plants.

Referring to FIG. 1, in one or more arrangements, the vibration isolator 12 may include a housing 12a having a first end 12b and a second end 12c positioned opposite the first end 12b. At least one wall 12d may extend between the first and second ends 12b, 12c. Each combination of conical disc spring members 20 and spacers 22, 24 inside a housing in a given embodiment of the vibration isolator forms an associated energy-absorbing structure incorporated into the housing. The housing first end 12b, second end 12c, and the wall(s) 12d may combine to define an interior 12e of the housing. Housing 12a may contain the deflectable and movable components (such as conical disc spring members 20 and spacers 22, 24 described below) forming the various energy-absorbing structures described herein, and provides a structure which is positionable and securable between the first and second elements 16, 14 to perform the vibration isolation function.

One or more force application members 13 may be coupled to the housing 12a so as to be movable with respect to the housing 12a. The force application member(s) 13 may extend from the interior 12e of the housing 12a to an exterior of the housing 12a, for example through a hole 12f formed in housing second end 12c. The force application member(s) 13 may enable forces to be transferred between elements (such as vehicle seat assembly 14) located exterior of the housing to the energy-absorbing structure located in the housing interior 12e. As shown in FIG. 1, a force application member 13 may contact a spacer 23 inside the housing. One or more shoulders 23s of the spacer 23 may be structured to engage a portion of an associated first conical disc spring member 20-1 adjacent a central opening in a first end of the first conical disc spring member 20-1 as shown in FIG. 1, to enable application of a force to a first end of the first conical disc spring member. Forces may be applied to the spacer 23 via force application member 13 to deflect the conical disc spring members 20 inside the housing. The force application member 13 may be a part of the vibration isolator 12, or the force application member 13 may be incorporated into (or may be in contact with) an element or mechanism to which the vehicle seat assembly 14 and/or the vibration isolator 12 are attached or coupled.

The vibration isolator 12 may also include at least one conical disc spring member. The isolator embodiment shown in FIG. 1 includes a plurality of conical disc spring members, generally designated 20. The conical disc spring members 20 may have the same shape and dimensions, or the conical disc spring members 20 may have different shapes and dimensions. The conical disc spring members 20 shown in FIG. 1 have the same shapes and dimensions.

Referring to FIGS. 1 and 2A-2C, in embodiments described herein, each conical disc spring member 20 is in the shape of a truncated, right circular cone. The general shape is known in the pertinent art in the form of a Belleville washer or conical disc washer, for example. Each conical disc spring member 20 has an associated first end 922 including a central opening 923 of the conical disc spring member 20, and a second end 924 opposite the first end 922. The second end 924 defines a circular base of the conical structure and includes an outer edge 925 of the conical disc spring member 20. A central axis 926 of each conical disc spring member 20 extends through a center of the central opening 923 and also through a center of the circular base 924. Also, the base 924 extends along a flat plane P1, and the central opening 923 extends along a flat plane P2 (which truncates the conical structure) parallel to the plane P1, with the central axis 926 extending perpendicular to plane P1 and also extending perpendicular to plane P2. In the embodiments shown in the drawings, the conical disc spring members 20 incorporated into the structure of the vibration isolator 12 are coaxially-aligned along the central axes 926 of the conical disc spring members 20.

Conical disc spring members 20 may be in the form of Belleville washers or similar structures designed or selected in accordance with the design parameters and considerations described herein, so as to provide the desired force-deflection characteristics. As is known, such structures act as spring members when a load is applied at either or both of the first end and the second end of the conical disc spring members, where the applied loading acts to deflect one of the first end 922 and the second end 924 in a direction toward the other of the first end 922 and the second end 924.

Referring again to FIG. 1, in the embodiment shown, at least one first conical disc spring member 20-1 may be positioned in the housing 12a. First conical disc spring member 20-1 may be coupled to spacer 23 so as to enable transfer of forces between the spacer 23 (in contact with force application member 13) and the first conical disc spring member 20-1. As seen in FIG. 1, a portion of the spacer 23 may extend into the central opening 923 of a first conical disc spring member 20-1. This arrangement may aid in maintaining alignment between the first conical disc spring member 20-1 and the spacer during loading.

Figure 4A:
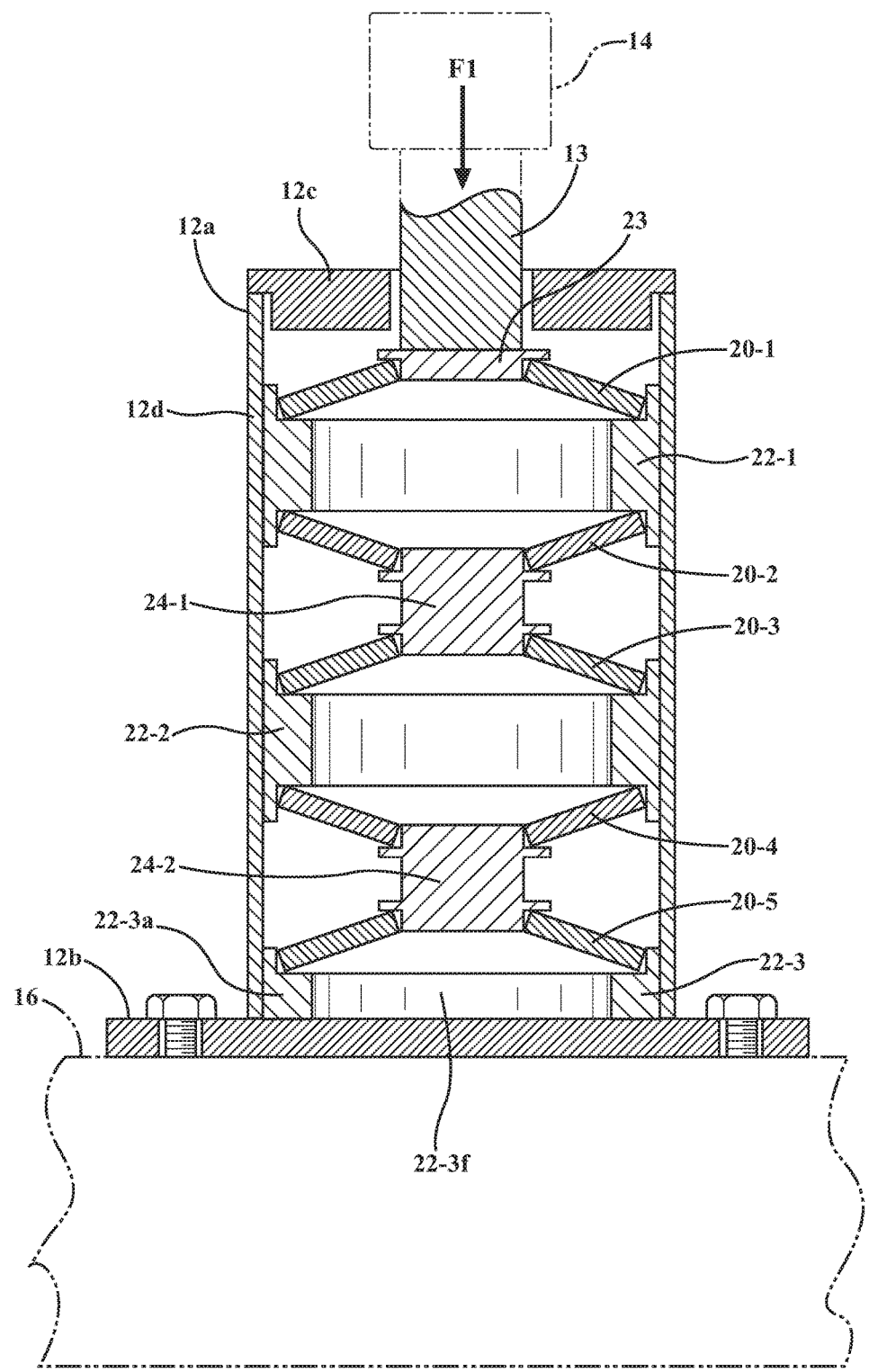
FIG. 4A is a schematic cross-sectional view showing a force F1 applied to the vibration isolator of FIG. 1 so as to deflect the conical disc spring member arrangement in the isolator.
Figure 4B:
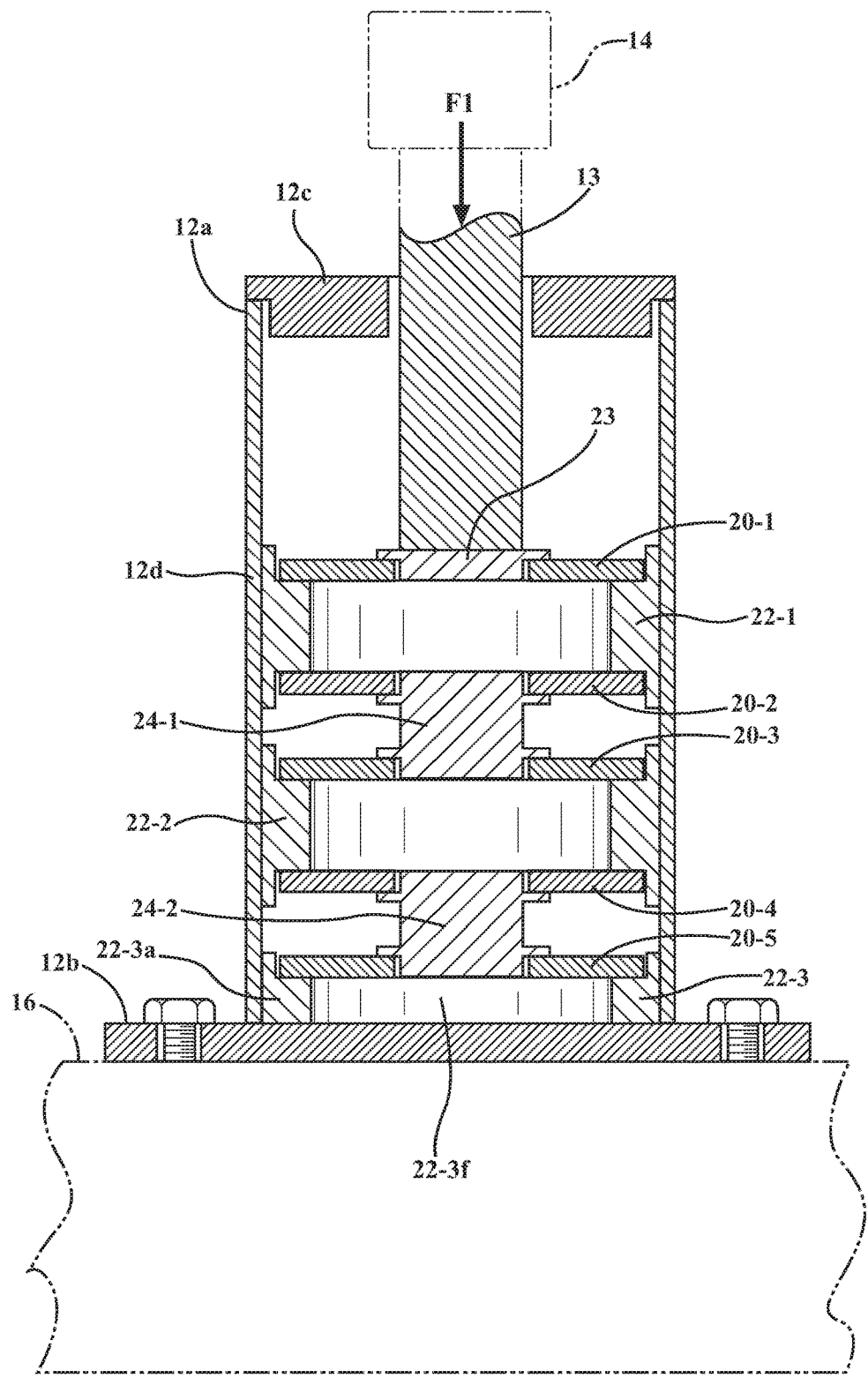
FIG. 4B is the schematic cross-sectional view of FIG. 4A showing the conical disc spring members in the isolator in flattened conditions, responsive to application of a force sufficient to produce a quasi-zero/negative stiffness response of the conical disc spring member arrangement.
Figure 4C:
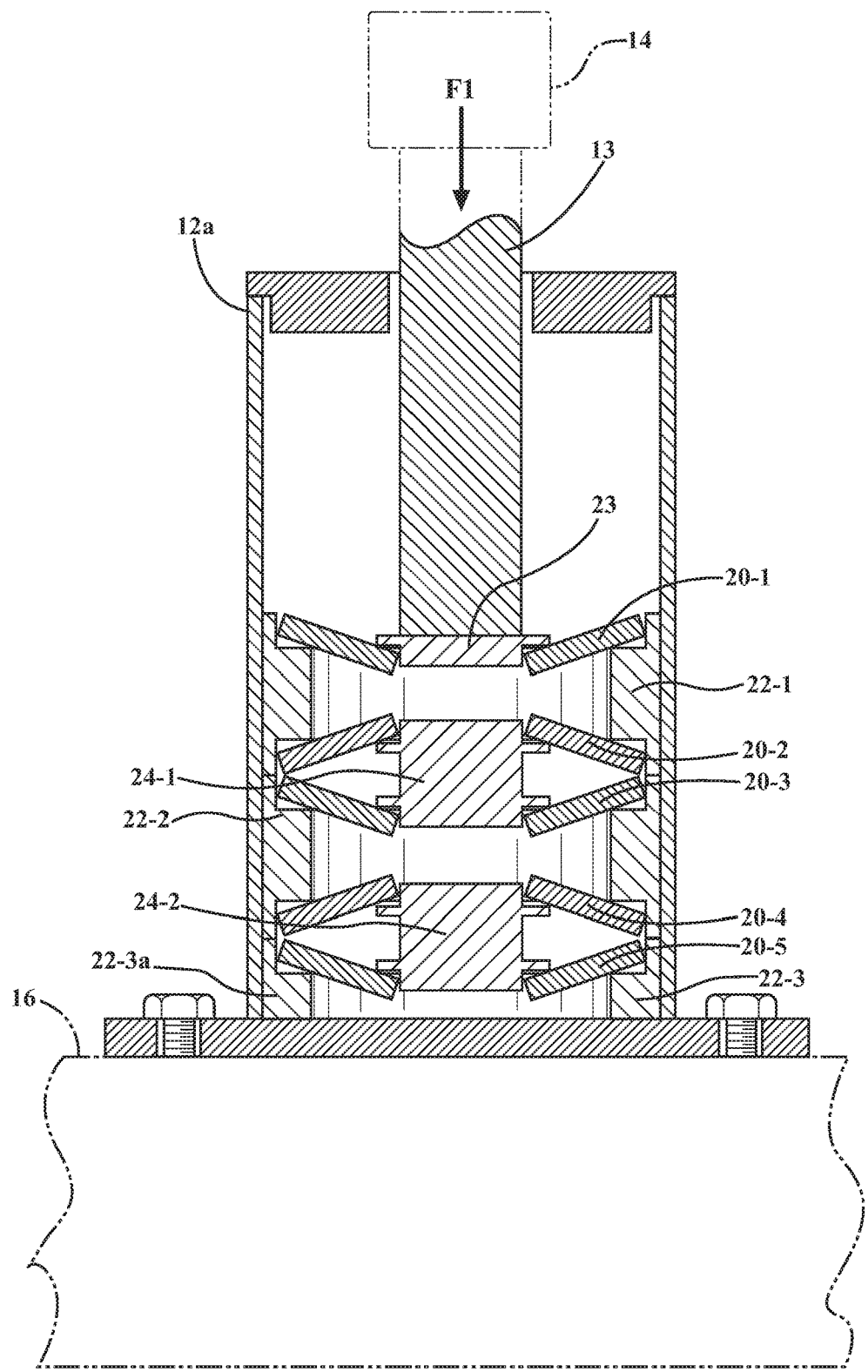
FIG. 4C is the schematic cross-sectional view of FIG. 4A showing the conical disc spring members in the isolator in inverted conditions, responsive to application of a force sufficient exceeding the force needed to produce a quasi-zero/negative stiffness response of the conical disc spring member arrangement.

For purposes described herein, two conical disc spring members are understood to reside adjacent each other when the spring members are positioned immediately next to each other, with no additional spring member between the two spring members. A spacer may be interposed between each two adjacent conical disc spring members. The spacer may be structured to engage each of the adjacent conical disc spring members so as to maintain a predetermined spacing between portions of the adjacent conical disc spring members during loading of the conical disc spring members. In the manner described herein, use of the spacer may also increase the deflection which may be achieved by the vibration isolator energy-absorbing structure during loading, by providing space for the conical disc spring members in contact with the spacer to flatten and invert under loading (as shown in FIGS. 4A-4C, for example). The various spacers described herein may be designed and dimensioned so as not to interfere with axial movement of the spacers with respect to each other, and may also be designed so as to not interfere with deflection and inversion of any of the conical disc spring members.

Each embodiment of a spacer described herein may operate to help space apart and/or maintain alignment and other spatial relationships between any conical disc spring members 20 in contact with the spacer. The use of spacers as described herein also enables greater control of the contact interfaces within the vibration isolator. Spacer materials may be specified which have relatively lower coefficients of friction in relation to the materials from which the conical disc spring members are formed. This may provide lower friction than would be possible with direct contact between the conical disc spring members. The conical disc spring member spacers may also include features (such as walls formed along outer edge of the spacers as described below) which act to maintain coaxial alignment of the spring members during loading of the vibration isolator.

Referring to FIG. 1, at least one first spacer 22-1 may be positioned in the housing interior 12e. FIG. 1 shows a pair of first spacers 22-1 and 22-2 positioned in housing 12a. Each of first spacers 22 (for example, first spacers 22-1 and 22-2 as shown in FIG. 1) has the same configuration. Thus, the description of spacer 22-1 set forth herein will also apply to spacer 22-2 and any other similarly configured spacers that may be incorporated into an embodiment of the vibration isolator.

The first spacer 22-1 may have a base portion 22-1a with a first side 22-1b and a second side 22-1c opposite the first side 22-1b. The first spacer 22-1 may be coupled to first conical disc spring member 20-1 along the base portion first side 22-1b so as to enable transfer of forces between first conical disc spring member 20-1 and the first spacer 22-1. The base portion first side 22-1b may define a first cavity 22-1d structured to receive therein a second end 924-1 of first conical disc spring member 20-1. The first cavity 22-1d may have a first cavity floor 22-1e. In the embodiment shown, first cavity 22-1d is formed by first cavity floor 22-1e and one or more walls 22-1g extending from the base portion 22a. The second end 924-1 of the first conical disc spring member 20-1 may be positioned in contact with the first cavity floor 22-1e. The first cavity floor 22-1e may also have a first opening 22-1f formed therein and positioned so as to reside opposite a first end of 922-1 the first conical disc spring member 20-1 when the second end 924-1 of the first conical disc spring member 20-1 is in contact with the first cavity floor 22-1e. The first opening 22-1f may be structured to receive at least a portion of the first end 922-1 of the first conical disc spring member 20-1 therein during an inversion of the first conical disc spring member 20-1 occurring during loading of the first conical disc spring member, as shown in FIG. 4C and as described herein. The opening 22-1f may lead into a through hole as shown in FIG. 1, or the opening may lead into a blind hole cavity extending into the base portion 22-1a to a depth sufficient to enable a conical disc spring member 20 to deflect into the opening and invert without contacting a bottom of the cavity.

As the second end 924-1 of the conical disc spring member 20-1 (and also the second ends of the other conical disc spring members) deflect radially inwardly and outwardly responsive to an axial loading applied to the vibration isolator, the second ends 924 and outer edges 925 of the conical disc spring members 20 may slide radially inwardly and outwardly along the surfaces (such as floor 22-1e) of the spacers with which they are in contact.

The first spacer base portion 22-1a may also include an outer edge 22-1h structured to be slidable along and with respect to housing wall(s) 12d during movement of the first spacer 22-1 within the housing 12a responsive to loading of the conical disc spring members. The base portion second side 22-1c may define a second cavity 22-1j structured to receive therein a second end 924-2 of second conical disc spring member 20-2. The second cavity 22-1j may have a second cavity floor 22-1k. In the embodiment shown, second cavity 22-1j is formed by second cavity floor 22-1k and one or more walls 22-1n extending from the base portion 22-1a along base portion second side 22-1c. The second end 924-2 of the second conical disc spring member 20-2 may be positioned in contact with the second cavity floor 22-1k. The second cavity floor 22-1k may also have a second opening 22-1m formed therein and positioned so as to reside opposite a first end 922-2 of the second conical disc spring member 20-2 when the second end 924-2 of the second conical disc spring member 20-2 is in contact with the second cavity floor 22-1k. The second opening 22-1m may be structured to receive at least a portion of a first end 922-2 of the second conical disc spring member 20-2 therein during an inversion of the second conical disc spring member 20-2 occurring during loading of the second conical disc spring member, as described herein. The second opening 22-1m may lead into a through hole as shown in FIG. 1, or the opening may lead into a blind hole cavity extending into the base portion to a depth sufficient to enable a conical disc spring member to deflect into the opening without contacting a bottom of the cavity.

Second conical disc spring member 20-2 may be coupled to the first spacer 22-1 along the base portion second side 22-1c so as to enable transfer of a force between the first spacer 22-1 and the second conical disc spring member 20-2. The second conical disc spring member 20-2 may be coupled to the first spacer 22-1 along the base portion second side 22-1c in the same manner as the first conical disc spring member 20-1 is coupled to the first spacer 22-1 along the base portion first side 22-1b, as previously described.

First spacer 22-2 may have the same design as spacer 22-1. In addition, the arrangement of conical disc spring member 20-3, first spacer 22-2, and conical disc spring member 20-4 is the same as that previously described for conical disc spring member 20-1, first spacer 22-1, and conical disc spring member 20-2, and will not be repeated in detail.

Referring to FIG. 1, at least one second spacer 24 may be positioned in the housing interior 12e. FIG. 1 shows a pair of second spacers 24-1 and 24-2 positioned in housing 12a. The second spacer 24-1 may be coupled to each of conical disc spring members 20-2 and 20-3 at first ends of the conical disc spring members so as to enable transfer of forces between the conical disc spring members 20-2 and 20-3 and the second spacer 24-1. Second spacer 24-1 may be structured to engage the first end 922-2 of conical disc spring member 20-2 to enable application of a force to the conical disc spring member tending to deflect the first end 922-2 of the conical disc spring member 20-2 toward the second end 924-2 of the conical disc spring member 20-2. The second spacer 24-1 may also be structured to engage the first end 922-3 of conical disc spring member 20-3 to enable application of a force to the conical disc spring member 20-3 tending to deflect the first end 922-3 of this conical disc spring member toward the second end 924-3 of the conical disc spring member 20-3.

In one or more arrangements, second spacer 24-1 may include one or more shoulders 24-1s structured to engage a portion of conical disc spring member 20-2 as shown, adjacent a central opening 923-2 formed in the first end of 922-2 the spring member 20-2. Shoulder(s) 24-1s may also be structured to engage a portion of conical disc spring member 20-3 as shown, adjacent a central opening 923-3 formed in the first end of 922-3 the spring member 20-3.

In addition, a second spacer 24-2 may be coupled to each of conical disc spring members 20-4 and 20-5 at first ends of the conical disc spring members so as to enable transfer of forces between the conical disc spring members 20-4 and 20-5 and the second spacer 24-2. Second spacer 24-2 may be structured to engage the first end 922-4 of conical disc spring member 20-4 to enable application of a force to the conical disc spring member tending to deflect the first end 922-4 of the conical disc spring member 20-4 toward the second end 924-4 of the conical disc spring member 20-4. The second spacer 24-2 may also be structured to engage the first end 922-5 of conical disc spring member 20-5 to enable application of a force to the conical disc spring member 20-5 tending to deflect the first end 922-5 of this conical disc spring member toward the second end 924-5 of the conical disc spring member 20-5.

In one or more arrangements, second spacer 24-2 may include one or more shoulders 24-2s structured to engage a portion of conical disc spring member 20-4 as shown, adjacent a central opening 923-4 formed in the first end of 922-4 the spring member 20-4. Shoulder(s) 24-2s may also be structured to engage a portion of conical disc spring member 20-5 as shown, adjacent a central opening 923-5 formed in the first end of 922-5 the spring member 20-5.

Conical disc spring member 20-5 may be positioned in contact with housing first end 12b as shown. An additional spacer 22-3 may have a base portion 22-3a and a first side 22-3b similar in structure to the first sides of first spacers 22-1 and 22-2 and may include an opening 22-3f enabling conical disc spring member 20-5 to invert into the opening, as previously described. Conical disc spring member 20-5 may be positioned in contact with the housing first end 12b to permit the conical disc spring member 20-5 to invert during loading, as described herein.

Although the embodiment of FIG. 1 shows a certain number of conical disc spring members and spacers alternately arranged in the housing 12a, in other embodiments any desired number of conical disc spring members and spacers may be positioned in the housing, in any arrangement necessary to provide desired force-deflection characteristics or magnitude of system deflectability for a particular application.

The vibration isolator structure embodiment in FIG. 1 shows the conical disc spring members arranged in a series configuration. For purposes described herein, conical disc spring members are understood to be stacked or arranged in a series configuration when the conical disc spring members are oriented with respect to each other as shown in FIG. 1, with each first end of a conical disc spring member positioned either in contact with or directly opposite and spaced apart from a first end of an adjacent conical disc spring member, and each second end of a conical disc spring member being positioned either in contact with or directly opposite and spaced apart from a second end of an adjacent conical disc spring member. Thus, the conical disc spring members 20 in FIG. 1 have alternating opposite orientations in the housing 12a as shown in FIG. 1 (i.e., a repeating sequence of conical disc spring member features encountered when proceeding in a direction from the housing second end 12c toward the housing first end 12b may be a conical disc spring member first end (such as 922-1), a conical disc spring member second end (such as 924-1), a conical disc spring member second end (such as 924-2), and a conical disc spring member first end (such as 922-2)). This arrangement has the general effect of adding spring constants of the conical disc spring members in series, resulting in a lower overall spring constant for the vibration isolator assembly and providing a greater available deflection of the vibration isolator energy-absorbing structure. Also, adding additional conical disc spring members coaxially arranged in this manner to the isolator assembly may further reduce the overall spring constant of the isolator assembly.

Two or more of the conical disc spring members of the vibration isolator may alternatively be arranged in a parallel configuration. Conical disc spring members are stacked or arranged in a parallel configuration when the conical disc spring members are oriented with respect to each other such that all of the conical disc spring members have the same orientation within the housing (i.e., a repeating sequence of conical disc spring member features encountered when proceeding in a direction from the housing second end 12c toward the housing first end 12b may be a conical disc spring member first end, then a conical disc spring member second end, then another conical disc spring member first end, etc., in alternating fashion). This arrangement has the general effect of adding spring constants of the conical disc spring members in parallel, resulting in a higher overall spring constant for the vibration isolator. Also, adding additional conical disc spring members coaxially arranged in this manner to the vibration isolator may further increase the overall spring constant of the vibration isolator.

Figure 3:
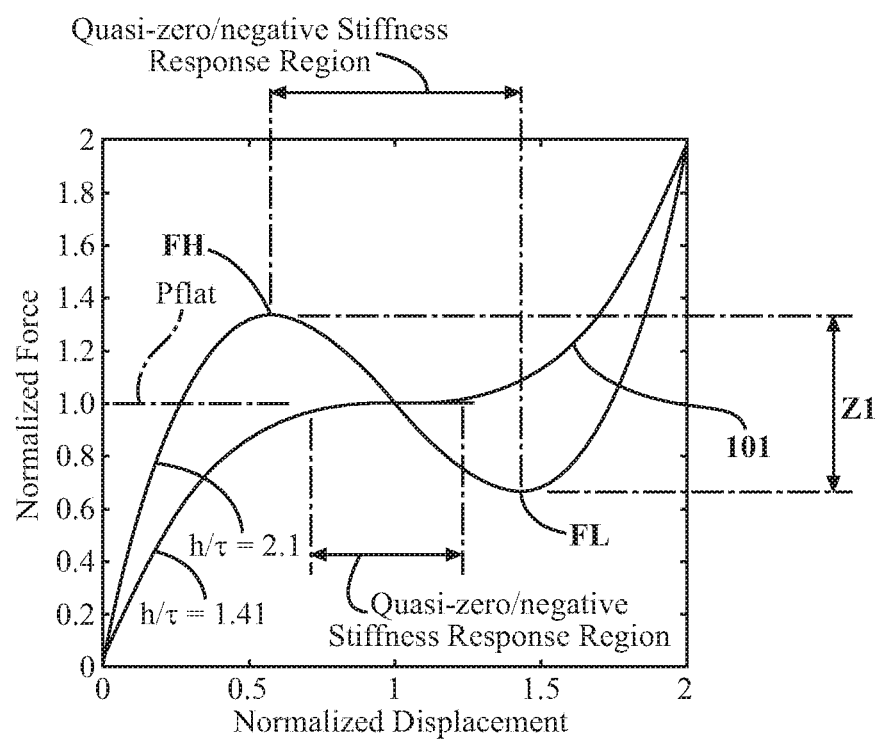
FIG. 3 is a graph illustrating a relationship between a design parameter $h/\tau$ and the force-deflection curve of a conical disc spring member designed in accordance with guidelines set forth herein.

Embodiments of the vibration isolator described herein are structured to provide a quasi-zero/negative stiffness response to a force applied to the vibration isolator when the applied force is within a predetermined range. A conical disc spring member as shown in FIG. 1 is known to have non-linear force-deflection characteristics. Various dimensions and design parameters which may be specified for a given design of a conical disc spring member are shown in FIGS. 2A-2C. In one or more arrangements, these dimensions and design parameters may be specified so as to provide a conical disc spring member having a force-deflection curve shaped generally as shown in FIG. 3. The deflection of the conical disc spring member represented in FIG. 3 is a deflection of the one of the first end 922 and the second end 924 toward the other one of the first end 922 and the second end 924 along the central axis 926.

One characteristic of this response curve is a region in which a slope of the curve may be zero, near zero, or negative for a certain applied force $P_{flat}$ (or for a range of applied forces centered about $P_{flat}$), and until the applied force increases to a certain level. This force or range of forces defines a "quasi-zero/negative" stiffness region of the force-deflection curve. In this quasi-zero/negative stiffness region, the conical disc spring member may experience a substantial increase in deflection responsive to little or no increase in the applied force ("quasi-zero" stiffness behavior), or the conical disc spring member may actually experience a temporary reduction in force during continued deflection ("negative" stiffness behavior).

It has been found that, when a force (such as a vibration or impulse load, for example) is applied to the conical disc spring member which produces a response of the spring member in the quasi-zero/negative stiffness region, transmission of the force through the conical disc spring member may be eliminated or substantially attenuated. It has been found possible to provide this quasi-zero/negative stiffness region in a given design of conical disc spring member by tailoring the values of certain design parameters and relationships. For example, FIG. 3 shows the effect on the force-deflection curve of varying the parameter h/T (i.e., the ratio of initial cone height h to shell thickness T as shown in FIG. 2A). From FIG. 3, it may be seen that a substantially flat or horizontal region of the force-deflection curve 101 may be provided for a certain h/τ ratio. The force $P_{FLAT}$ at which this quasi-zero stiffness response occurs or begins for a given conical disc spring member design may be determined in terms of h and τ using the following relationship:

$$P_{Flat} = \frac{\pi E h \tau^3}{a^2} \left( \frac{\alpha+1}{\alpha-1} - \frac{2}{\ln \alpha} \right) \left( \frac{\alpha}{\alpha-1} \right)^2 \quad (1)$$

where the parameter α is equal to the ratio a/b of mid-surface outer radius a to mid-surface inner radius b, as shown in the parameter definitions of FIGS. 2A-2C.

Normalized force-deflection curves for h/τ ratios of 1.41 and 2.1 are shown in FIG. 3. It may be seen that a substantially flat or horizontal region of the force-deflection curve occurs for the h/τ ratio of 1.41. Also, as seen in FIG. 3, the curve 311 for an h/τ ratio of 2.1 exhibits negative stiffness behavior in the middle portion of the curve.

All of the conical disc spring member embodiments described herein are designed or selected so as to exhibit a quasi-zero/negative stiffness response region in their respective force-deflection curves. In one or more arrangements, conical disc spring members having h/τ ratios in the range 1.41 to 2.1 inclusive are used for the purposes described herein. That is, each conical disc spring member incorporated into the vibration isolator is selected or designed so as to have an h/τ ratio in the range 1.41-2.1 inclusive. Such conical disc spring members have been found to provide quasi-zero/negative stiffness response regions suitable for the purposes described herein.

In one or more arrangements, for purposes of targeting a level of force F1 to be applied to the vibration isolator to produce the quasi-zero/negative stiffness response (or for purposes of designing a conical disc spring member arrangement which will provide quasi-zero/negative stiffness response for a given applied force), an effective quasi-zero/ negative stiffness response zone Z1 may be established. As shown in FIG. 3, for a curve with a h/τ ratio of closer to 2.1, for example, such a zone Z1 may be bounded by a highest force FH at which the quasi-zero/negative stiffness response for the arrangement of conical disc spring members of the vibration isolator begins, and a lowest force FL at which the quasi-zero/negative stiffness response for the arrangement of conical disc spring members of the vibration isolator ends. In one or more arrangements, for conical member spring and system design purposes, a conical disc spring member arrangement as shown in FIGS. 1 and 4A-4C and designed in accordance with the principles described herein may be assumed to exhibit quasi-zero/negative stiffness behavior in response to applied forces falling within a range of forces defined in this manner. Thus, a vibration isolator exhibiting quasi-zero/negative stiffness behavior in response to applied forces in zone Z1 may be used in a system where this range of applied forces will be encountered. Alternatively, the location of zone Z1 on the force-deflection curves may be tailored so that the isolator will exhibit quasi-zero/negative stiffness behavior in response to a known, predetermined force or target range of applied forces. The effective quasi-zero/negative stiffness response zone Z1 may also be defined in an alternative manner.

It has also been found that similar quasi-zero/negative stiffness response regions may be provided in the force-deflection curves of arrangements of two or more conical disc spring members as described herein, responsive to application of a force of a given magnitude and where each individual conical disc spring member of the arrangement has been selected or designed to provide a quasi-zero/negative stiffness response region as shown in FIG. 3. When subjected to a force in this quasi-zero/negative stiffness region, the entire arrangement of conical disc spring members may experience a substantial increase in deflection responsive to little or no increase in the applied force and/or may experience a temporary reduction in applied force during continued deflection. Deflection of an entire arrangement of conical disc spring members may be defined as the combined axial deflection of all of the conical disc spring members of the arrangement responsive to an applied loading of the arrangement. Thus, for example, the deflection of the arrangement may vary during use and with the cyclic loading imposed by an ongoing vibrational load.

It has been found that, when a force of a certain magnitude (such as a vibration or impulse load) is applied to an arrangement of multiple conical disc spring members designed in accordance with the guidelines described above, a response of the arrangement in the quasi-zero/negative stiffness region may be achieved. When the applied vibration forces operate to produce a force-deflection response of the arrangement in the quasi-zero/negative stiffness region, it has been found that transmission of the vibrations one of the first element and the second element coupled to the vibration isolator to the other one of the first element and the second element may be eliminated or substantially attenuated. It has also been found that transmission of low frequency vibration forces (in the range 0-10 Hz) experienced by a vehicle chassis may be eliminated or substantially attenuated by a vibration isolator mechanism in accordance with an embodiment described herein. The exact force (or forces) at which quasi-zero/negative stiffness regions will be produced in a given vibration isolator design may depend on the particular arrangement of conical disc spring members.

It has also been found that the extent of the quasi-zero/negative stiffness region of a given arrangement of conical disc spring members may be extended or maximized by enabling each conical disc spring member to resiliently invert (as seen in FIG. 4C, for example) to the greatest degree possible during loading. It is desirable for the extent of the quasi-zero/negative stiffness region to be as large as possible, to maximize the range of operational loads over which a quasi-zero/negative stiffness response may be achieved. The openings (such as opening 22-1f, for example) formed in cavity floors of the spacer base portions described herein may be designed to permit the conical disc spring members positioned over the openings to invert to greatest degree possible during loading, consistent with resilient deflection of the conical disc spring members. Inversion of a conical disc spring member under load may be defined as a condition as shown in FIG. 4C, in which the force applied to the conical disc spring member is such that at least a portion of a first end of a spring member (such as first end 922-1 of spring member 20-1) resiliently deflects from an unstressed state (as shown in FIG. 1) past the flattened configuration shown in FIG. 4B, to a location below a floor (such as 22-1e) of a spacer supporting the conical disc spring member, as shown in FIG. 4C. Examples of such an arrangement are shown in FIGS. 4A-4C for the vibration isolator shown in FIG. 1.

Figure 7:
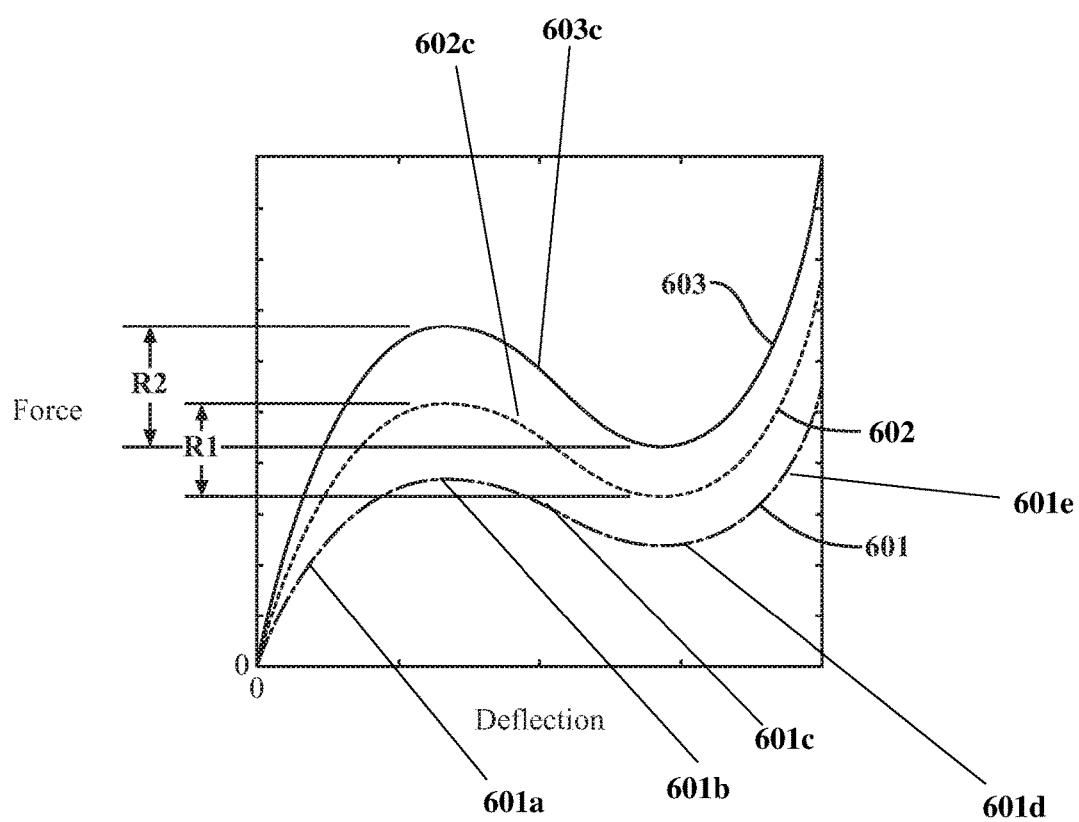
FIG. 7 is a graphical representation of exemplary force-displacement curves for the vibration isolator embodiment shown in FIGS. 1 and 4A-4C, and also the embodiment shown in FIGS. 5A-6C.

FIGS. 4A-4C show schematic side cross-sectional views of the vibration isolator embodiment 12 of FIG. 1 incorporating spacers 22-1 and 22-2 which are designed to enable inversion of the conical disc spring members 20-1 through 20-4 coupled to the spacers. FIG. 7 shows an exemplary force-displacement curve 601 for the conical disc spring member arrangement shown in FIGS. 1 and 4A-4C.

Behavior of a conical disc spring member arrangement shown in FIG. 1 during deflection and inversion of the spring members 20-1 through 20-5 will be described with reference to FIGS. 4A-4C. The exemplary force-displacement curve 601 shown in FIG. 7 is for purposes of illustrating the force-deflection characteristics of the conical disc spring member arrangement shown in FIGS. 1 and 4A-4C. The particular force values and deflection values shown may differ according to the details of particular spring member designs, spacer dimensions, and other factors. However, the curve of FIG. 7 provides a qualitative representation of the force-deflection response which may be obtained from the conical disc spring member arrangement shown in FIGS. 1 and 4A-4C.

FIG. 4A shows a force F1 applied to the vibration isolator 12 so as to deflect conical disc spring members 20. As stated previously, conical disc spring members 20 incorporated into the vibration isolator 12 all have the same design/dimensions. Curve 601 of FIG. 7 is a representative force-deflection curve for the conical disc spring member arrangement of isolator assembly 12 during application of the force F1. Forces may be applied to the vibration isolator by movement of the housing 12a relative to the force application member(s) 13 and/or by movement of force application member(s) 13 relative to housing 12a. Forces applied to the vibration isolator via a relative movement of the housing 12a may cause reaction forces to be generated at force application member(s) 13.

Referring to FIGS. 4A and 7, when force F1 is applied to the conical disc spring member arrangement shown in FIG. 1, the conical disc spring member arrangement may initially deflect as indicated by portion 601a of the curve 601, up to a certain force level 601b. At this force level, a quasi-zero/negative stiffness region 601c of the curve 601 may be reached, in which the arrangement of conical disc spring members may experience increased deflection with no additional force and/or a drop in force with further deflection.

Also, at this point, the conical disc spring members may have been deflected to conditions similar to that shown in FIG. 4B, in which the conical disc spring members are flat or nearly flat. As the force F1 applied to the conical disc spring members 20 continues to increase, an end of the quasi-zero/negative stiffness region 601c may be reached at a location 601d. After the quasi-zero/negative stiffness region 601c is passed, as the applied force F1 increases, the conical disc spring members 20 may continue to resiliently deflect past the flat state as indicated by portion 601e of the curve 601, until the conical disc spring members are inverted (i.e., oriented in directions opposite to their initial configurations shown in FIG. 4A), as shown in FIG. 4C.

The base portion openings (such as opening 22-1f in first spacer 22, for example) may be structured or dimensioned so as to permit the first ends of conical disc spring members 20 to resiliently deflect into the openings and invert without the first ends of the conical disc spring members contacting the associated spacers. This enables maximum resilient deflection of the conical disc spring members 20 during inversion. Thus, the provision of openings in the spacer members enables the conical disc spring members 20 to invert during axial loading of the vibration isolator, thereby providing the energy-absorbing structure with greater resilient deflectability. Also, by permitting the conical disc spring members to invert during applied loading, it is ensured that the conical disc spring members will reach the portion 601e of the curve, thereby ensuring that the extreme limit of the quasi-zero/negative stiffness region 601c has been reached and that the entire quasi-zero/negative stiffness region 601c has been utilized during operation of the vibration isolator. This provides the greatest operational flexibility of the vibration isolator during loading.

Using the relationships set forth herein, a conical disc spring member arrangement may be designed for an expected axial loading of the vibration isolator (for example, using analytical and/or experimental methods) so that the expected loading occurs within the force or range of forces encompassed by the quasi-zero/negative stiffness region of the vibration isolator, thereby enabling these forces to be isolated or substantially attenuated by the energy-absorbing structure. For example, conical disc spring members and associated spacers may be provided and arranged as shown in FIG. 1. This conical disc spring member arrangement may be tested by applying an axial loading equal to an anticipated operational loading, and the force-deflection results evaluated. The conical disc spring member arrangement may then be modified as desired, for example, by using conical disc spring members having different dimensions and/or by increasing or decreasing the number of conical disc spring members. Alternative arrangements (i.e., series, parallel, or combinations of series and parallel arrangements) of conical disc spring members may also be evaluated. This process may be continued until an optimum conical disc spring member arrangement is obtained which provides a quasi-zero/negative stiffness region at a force level equal or close to the expected loading. However, any conical disc spring members used should be designed or selected in accordance with the guidelines previously discussed, to help ensure that the resulting conical disc spring member arrangement will provide a quasi-zero/negative stiffness region as previously described.

Design parameters affecting the force-deflection curve of a particular conical disc spring member arrangement may include the number of conical disc spring members in the vibration isolator, the dimensions of the conical disc spring members, the spatial arrangement of the conical disc spring members, and other pertinent parameters. Although the drawings show conical disc spring members arranged in a series configuration, other spatial arrangements may be used to vary and adjust the force-deflection response of the conical disc spring member arrangement for a given loading.

In a vibration isolator configured as shown in FIG. 1 to provide a quasi-zero/negative response to application of a force or a range of forces, it has also been found possible to tune or adjust the force-deflection curve of the vibration isolator so that the force at which the quasi-zero/negative response occurs will be equal to a loading force applied to the vibration isolator, or so that a range of forces over which the quasi-zero/negative response occurs will include the applied load. This adjustability enables an existing vibration isolator design to be modified to provide a quasi-zero/negative deflection region for a different or expanded range of loadings without changing the number, spatial arrangement, or design of the conical disc spring members in the vibration isolator assembly.

It has been found that the force at which the onset of the quasi-zero/negative deflection characteristics of the isolator occur or begin may be adjusted or tuned by resisting radially outward deflection or movement of the conical disc spring member outer edges during axial loading of the assembly (due to an applied vibration, for example). In a manner described herein, resisting radially outward movement of the conical disc spring member outer edges during loading of the isolator may act to shift the isolator force deflection curve so that a range of forces over which the quasi-zero/negative response occurs will encompass the load applied to the isolator.

FIGS. 5A-6C and 8A-8B illustrate schematically one method of resisting radially outward deflection of the conical disc spring member outer edges during axial loading of the isolator assembly. In this method, during application of a load F1 to the vibration isolator and its arrangement of conical disc spring members 20, forces FR resisting the deflection are applied to the outer edges 925 of each conical disc spring member by an embodiment of a conical disc spring member deflection resistance mechanism (generally designated 390). The applied forces FR may be directed generally radially inwardly (in a direction toward the conical disc spring member central axes 926). The forces FR may be applied along the entire outer edge of the conical disc spring member, or the forces FR may be applied to diametrically opposite portions of the conical disc spring member extending along a predetermined arc length of the outer edge. Application of the resistance forces FR to opposite portions of the outer edge 925 may act to balance the forces on opposite sides of the edge.

The isolator embodiment shown in FIGS. 5A-6C may be structured and operate in the same basic manner as the embodiment shown in FIGS. 1 and 4A-4C, except that the embodiments shown in FIGS. 5A-6C includes, in addition to the elements shown in FIGS. 1 and 4A-4C, a spring member deflection resistance mechanism (generally designated 390) positioned adjacent an outer edge of each conical disc spring member.

Referring to FIGS. 5A-6C and 8A-8B, in one or more arrangements described herein, each spring member deflection resistance mechanism 390 may be coupled to an associated spacer (such as spacer 22-1 shown in FIG. 8A), and may be structured to be operable to adjustably resist movement of the outer edge of an associated conical disc spring member in directions radially outwardly with respect to the central axis of the conical disc spring member, during application of a force to the spring member tending to deflect one of the spring member first end and second end toward the other one of the spring member first end and second end.

Operation of resistance mechanism to resist movement of the outer edges of the conical disc spring member also acts to correspondingly control the force required to deflect one of the spring member first end and second end toward the other one of the spring member first end and second end. The restraining force may adjustably resist deflection of the outer edges of the conical disc spring members 20 in that the restraining force may be applied or removed as needed, according to the applied loading of the isolator assembly.

In one or more arrangements, and as shown in FIGS. 5A-6C and 8A-8B, the spring member deflection resistance mechanism 390 may be coupled to base portion (such as base portion 22-1a of spacer 22-1, for example) and may be structured such that at least a portion of the spring member deflection resistance mechanism extends between the housing wall 12d and the conical disc spring member outer edge 925. In this configuration, the spring member deflection resistance mechanism may move along the housing interior with the spacer and its associated conical disc spring member.

In the following, physical and operational characteristics of one embodiment of the spring member deflection resistance mechanism embodiment shown in FIGS. 5A-6C and 8A-8B will be described with respect to spacer 22-1 and conical disc spring member 20-1 of FIGS. 5A-6C. However, it will be understood that the spring member deflection resistance mechanisms 390 coupled to the other spacers 22-2 and 22-3 have the same structures and operate in the same manner as the spring member deflection resistance mechanisms 390 coupled to spacer 22-1.

Referring to FIGS. 5A-6C, 7, and 8A-8B, in one or more arrangements, the spring member deflection resistance mechanism 390 may comprise a bearing member (generally designated 390a) structured to apply an adjustable resistance FR force to the outer edge 925 of an associated conical disc spring member 20, responsive to a force applied to the bearing member by the conical disc spring member. The bearing member may be secured to the spacer base portion 22-1a using hardware or any other means suitable for enabling deformation of the bearing member as described herein.

In particular arrangements, and as shown in FIGS. 5A-6C and 8A-8B, a portion of the spacer base portion outer edge 22-1h may form a wall extending from the cavity floor 22-1e. The bearing member 390a (or a portion thereof) may be positioned between the base portion outer edge wall and the outer edge 925-1 of the conical spring disc member 20-1, and may abut the base portion outer edge wall for support.

The bearing member 390a may be dimensioned and/or positioned so as to be in contact with the outer edge 925-1 of the conical disc spring member 20-1 when the spring member is not subjected to a load F1 applied to the vibration isolator. This enables the bearing member 390a to exert a restraining force on spring member radial expansion as soon as the spring member 20-1 is axially loaded. Depending on the difference between the outer diameter of the spring member outer edge and the inner diameter of the bearing member, this contact may act to impose a slight pre-load on the outer edge of the conical disc spring member.

In one or more arrangements, the bearing member 390a may be formed from a shape memory polymer (SMP) material, and the bearing member activation mechanism 390b may be an electrically conductive heating element positioned in physical contact with the shape memory polymer material so as to enable heating of at least the portion of the bearing member material in contact with the outer edge 925-1 of the conical disc spring member 20-1.

As is known, shape memory polymers are polymeric materials which have the ability to return from a deformed state to an original shape when acted on by an external stimulus, such as temperature change. These materials exhibit a large difference in elastic or Young's modulus (E) below and above a phase transition temperature. Young's modulus decreases significantly as the polymer is heated from below the transition temperature to above the transition temperature.

Above the transition temperature, strain can be introduced into the polymer with relative ease. If the induced strain is maintained and the temperature of the material is decreased below the transition temperature, the strain is 'frozen in'. This strain may be recovered when the polymer is heated above the transition temperature again (i.e., the polymer will return to its shape, barring the application of a force to the polymer which prevents return to its original shape). The polymer may be heated in any suitable manner. For example, a conductive wire may be inserted or passed through a component formed from the SMP, and a current may be passed through the wire to eat the polymer. In addition to temperature change, the shape change of some shape memory polymers can also be triggered by application of an electric or magnetic field, or the application of light.

In addition, a bearing member activation mechanism may be operatively coupled to the bearing member and may be structured to be operable to control a stiffness of the bearing member. By adjusting the stiffness of the bearing member, the resistance of the bearing member to radial movement or expansion of the spring member outer edge may be varied. In applications where the bearing member is formed from a temperature-activatable shape memory polymer, the bearing member activation mechanism may be formed from an electrically conductive heating element (generally designated 390b) positioned in physical contact the bearing member so as to enable heating of at least the portion of the bearing member in contact with the outer edge of an associated conical disc spring member. This enables heating of the bearing member to a temperature above the transition temperature, thereby changing the elastic modulus E of the bearing member in contact with the conical disc spring member and enabling the shape of the bearing member to be varied. The heating element 390b may be, for example, in the form of a Nichrome wire embedded in the material of the bearing member 390a as shown in the drawings.

Figure 8A:
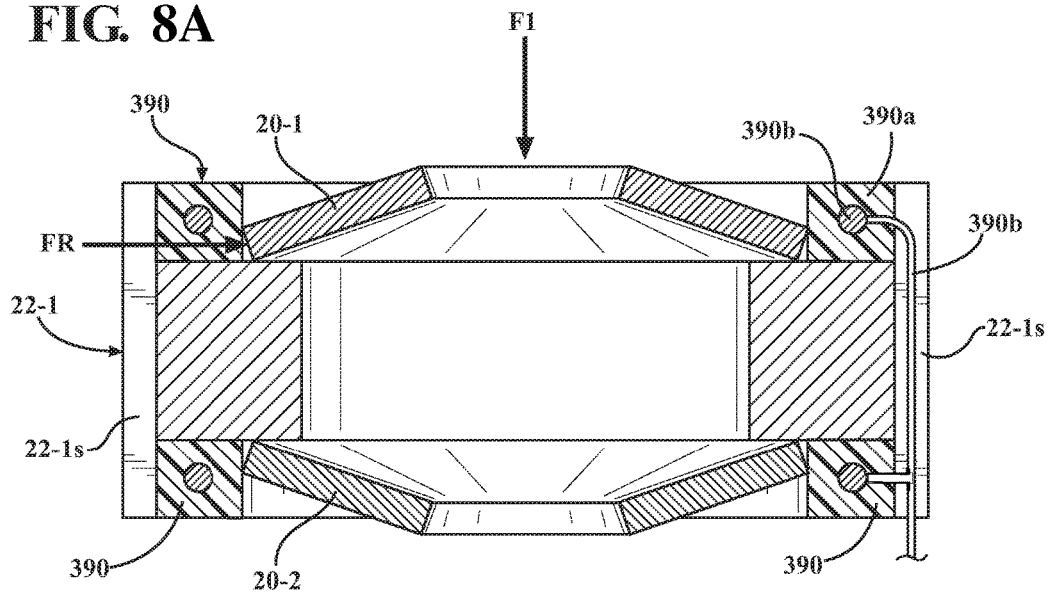
FIG. 8A is a schematic cross-sectional view of a spacer structure as shown in the isolator embodiment of FIGS. 5A-6C, showing positioning of a conical disc spring member in contact with the spacer, and showing operation of a deflection resistance mechanism to apply a resistance force FR to outer edges of the spring member to restrict movement of the outer edges.
Figure 8B:
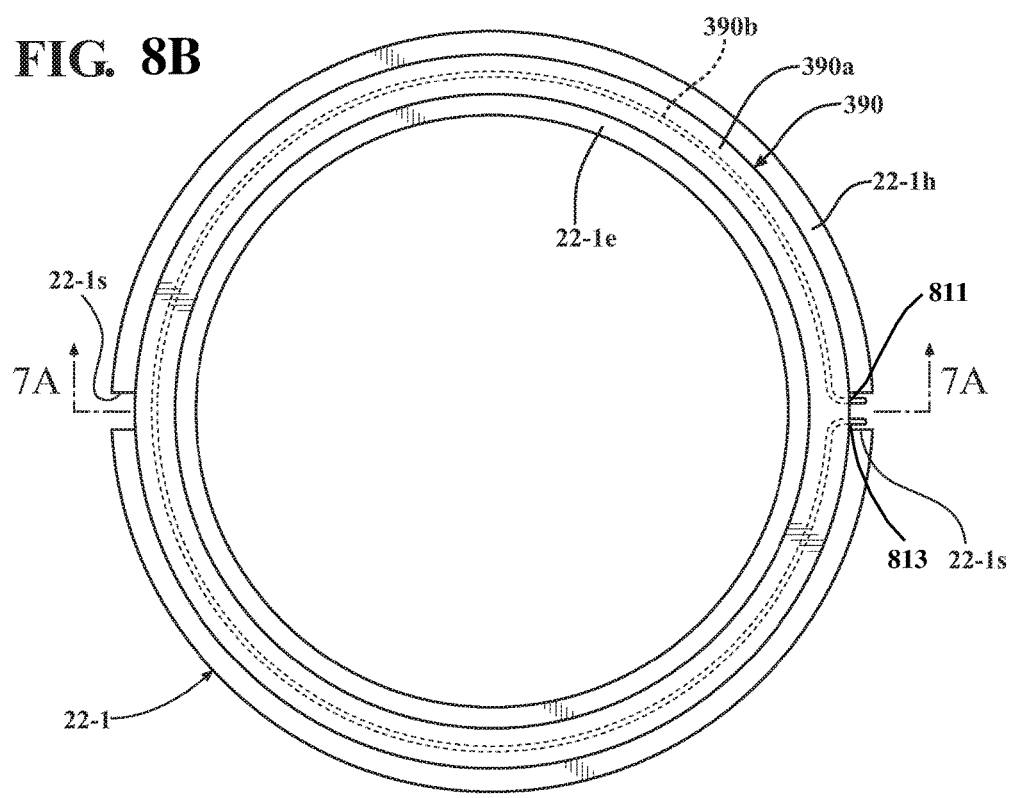
FIG. 8B is a schematic plan view of the spacer shown in FIG. 8A.

FIGS. 5A-6C show wires 390b extending adjacent housing wall 12d and into and along the interiors of the bearing members 390a positioned on the spacers 22-1 through 22-3. First ends of the wires 390b may enter the housing 12a through an opening formed in housing first end 12b. Second ends of the wires opposite the first ends may be routed to a current/power source 160 (FIG. 10) configured to provide electrical power to the wires as needed for functioning of the isolator as described herein. Referring to FIGS. 8A and 8B, gaps 22-1s may be formed along opposite sides of the wall formed by base portion outer edge 22-1h, permitting the wires 390b to pass through the spacers and enabling the wires to enter and exit the bearing members 390a.

For example, in the embodiment shown in FIGS. 7A and 7B, the wire(s) 390b enter the bearing member 390a at a first location 811, extends continuously along the interior of the annular bearing member 390a, and exits the bearing member at a second location 813 adjacent the first location 811. The wire(s) 390b may extend along the wall(s) 12d of the housing between the spacers.

Although a pair of opposed gaps 22-1s are shown in the drawings, the spacers may include any number of gaps necessary to facilitate the positioning and operation of the wires 390b needed to provide the desired results. In addition, although wires are shown extending along only one side of the housing, wires may extend along multiple sides or portions of the housing wall 12d as needed for operation of the vibration isolator.

FIGS. 5A-6C illustrate operation of an embodiment of the vibration isolator incorporating bearing members 390a formed from an SMP material, and a bearing member activation mechanism 390b in the form of conductive/resistive wires designed to heat the SMP material to a temperature above the SMP material phase transition temperature. The general arrangement shown may also apply to an embodiment of the isolator using a rigidity-tuning electrically conductive elastomer material for the bearing member, as described herein.

The vibration isolator 112 shown in FIGS. 5A-6C may utilize an SMP material for the bearing member 390a, and may energize or activate the SMP material by passing an electric current through a conductive activation mechanism 390b embedded (or in contact with) the SMP material to produce a reduction in the mechanical stiffness of at least the portion of the SMP material in contact with the conical disc spring member.

Curve 601 represents the force-deflection response of an isolator assembly as previously described with respect to FIG. 1, which is not structured to provide any physical resistance to movement of the outer edges of the conical disc spring members during application of an axial force F1 to the isolator assembly.

Figure 5A:
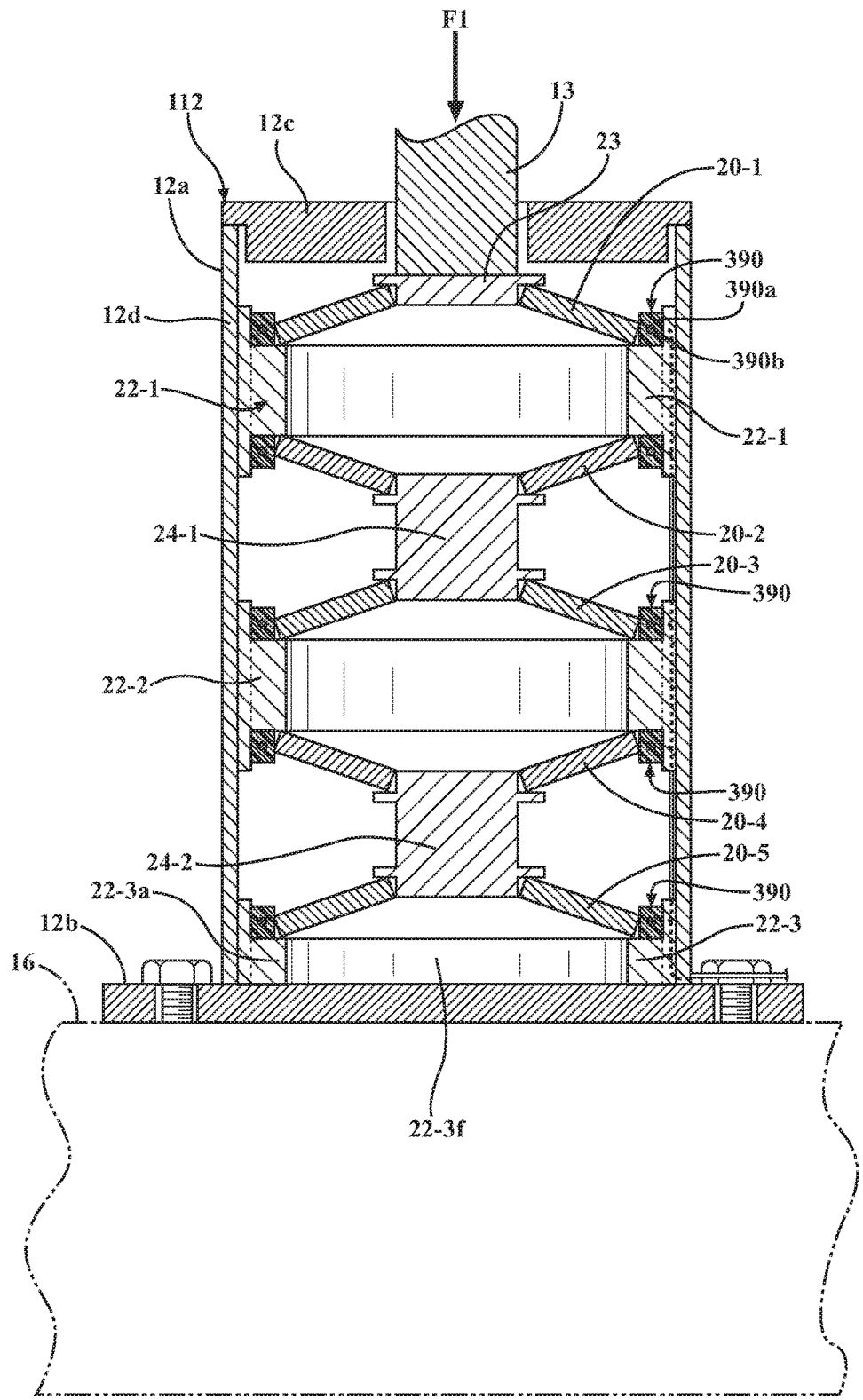
FIG. 5A is a schematic cross-sectional view of an alternative embodiment of the vibration isolator, incorporating an embodiment of a conical disc spring member deflection resistance mechanism structured to exert forces against outer edges of the conical disc spring members to resist radially outward movement of the outer edges, showing the deflection resistance mechanisms in unactivated states to provide maximum resistance to conical disc spring member radial deflection, and showing a force F1 applied to the vibration isolator so as to deflect the conical disc spring member arrangement in the isolator.
Figure 5B:
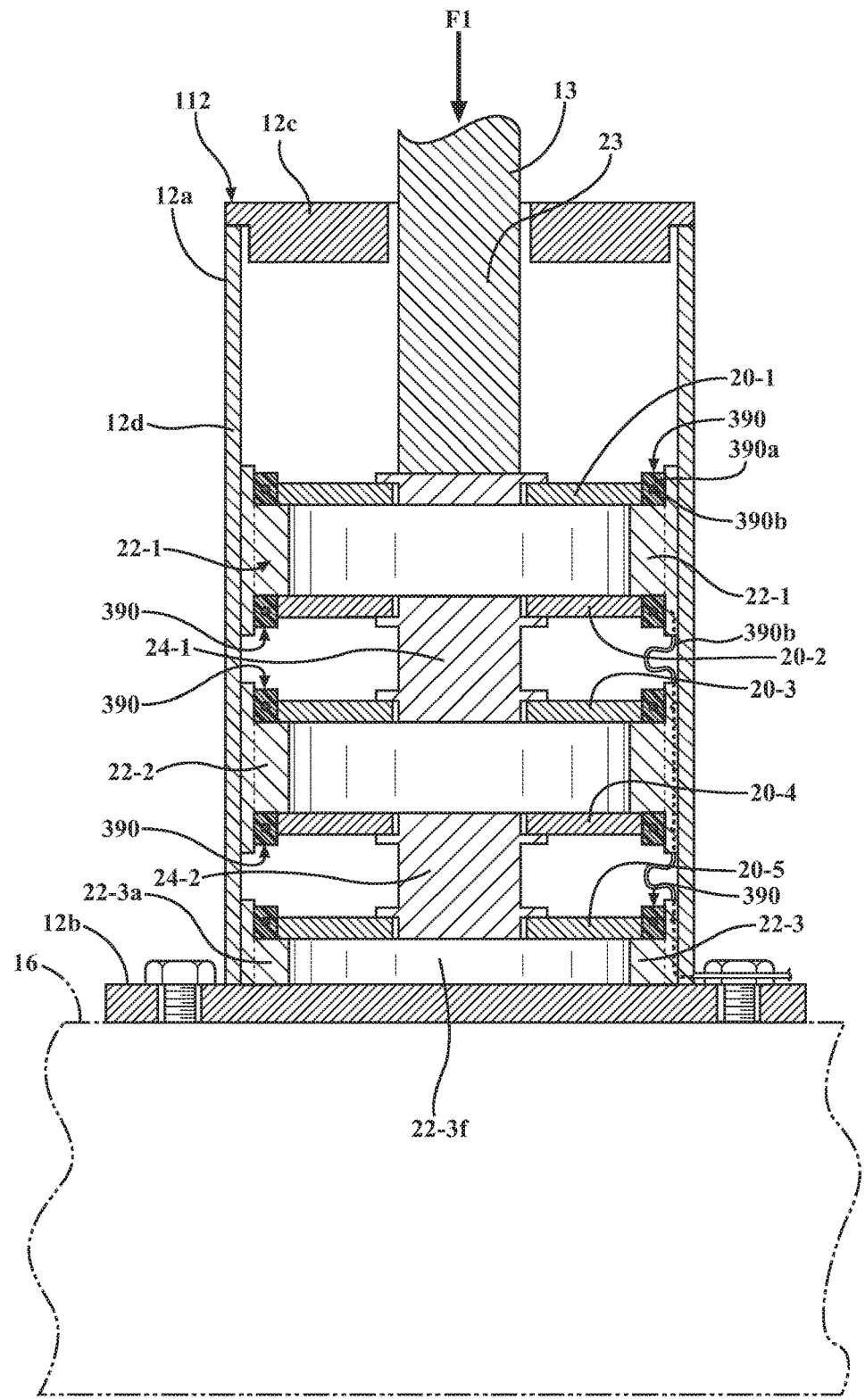
FIG. 5B is the schematic cross-sectional view of FIG. 5A showing the conical disc spring members in the isolator in flattened conditions, responsive to application of a force sufficient to produce a quasi-zero/negative stiffness response of the conical disc spring member arrangement.
Figure 5C:
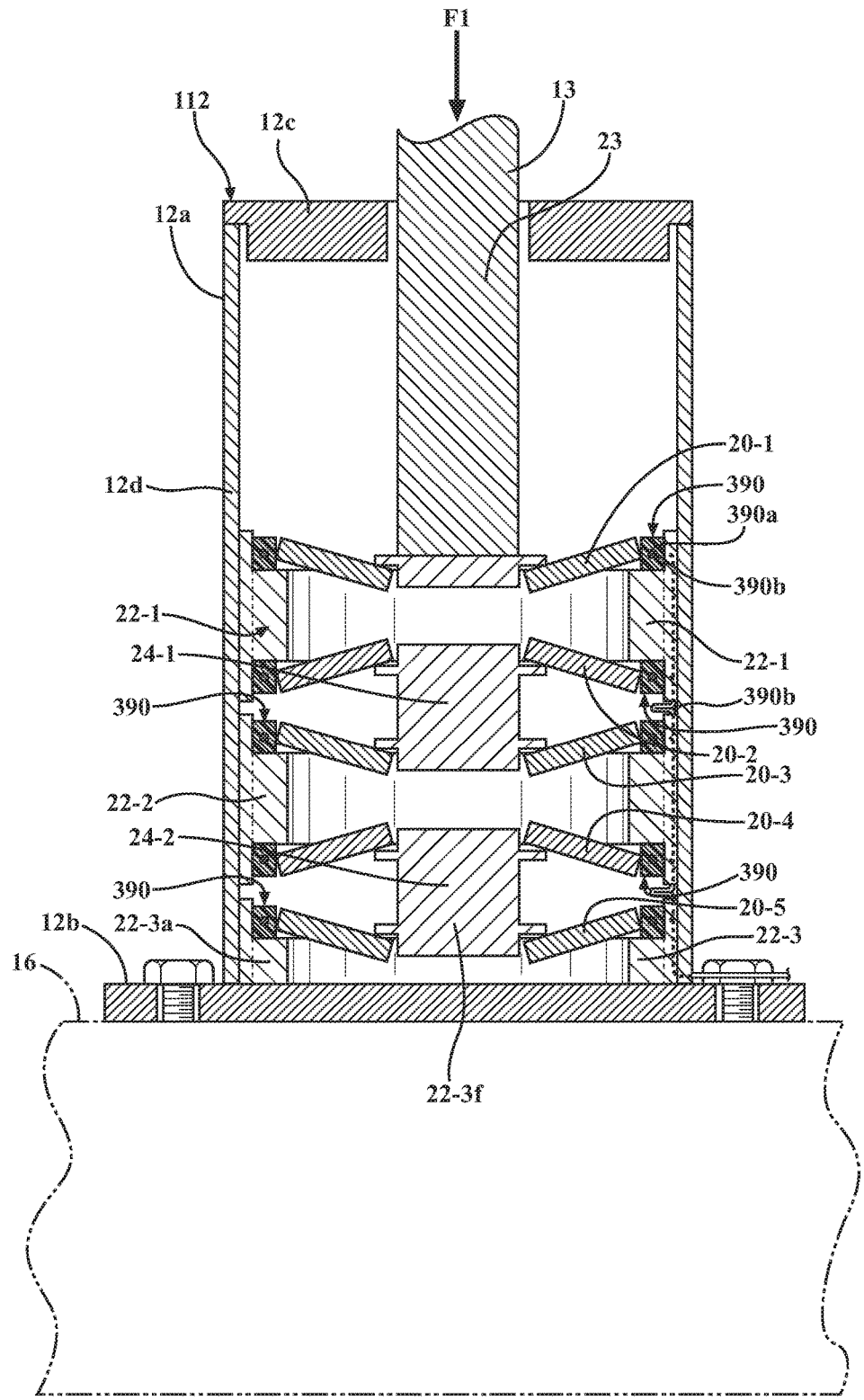
FIG. 5C is the schematic cross-sectional view of FIG. 5A showing the conical disc spring members in the isolator in inverted conditions, responsive to application of a force sufficient exceeding the force needed to produce a quasi-zero/negative stiffness response of the conical disc spring member arrangement.

When the bearing members 390a are unactivated or unheated, bearing members 390a may have rectangular cross-sectional shapes as shown in FIGS. 5A-5C. When unheated, the elastic moduli of the bearing members 390a are relatively higher, increasing the stiffness of the SMP material. Thus, when a force F1 is applied to the vibration isolator 112 and transferred to the conical disc spring members 20, the bearing members 390a exhibit little if any deformation due to forces applied by deflection of the spring member outer edges. Thus, the bearing members 390a provide a relatively high resistance to movement of the conical spring disc member outer edges, as the spring members continue to deflect to a relatively flat state (FIG. 5B), then to an inverted state (as shown in FIG. 5C).

This is reflected in the force-deflection curve 603, which indicates how the relatively higher resistance to spring member deflection raises the overall level of the force-deflection curve from 601 (no resistance to deflection) to 603 (relatively high resistance to deflection), thereby correspondingly raising the quasi-zero/negative stiffness region over which a quasi-zero/negative stiffness response is provided by the conical disc spring member arrangement, from 601c to 603c. Curve 603 may have a shape and characteristics (including a quasi-zero/negative stiffness response region 603c) similar to those of curve 601 previously described. Thus, in the state shown in FIGS. 5A-5C, the vibration isolator may provide a quasi-zero/negative stiffness response to applied forces in the force range or zone R2 show in FIG. 7.

Figure 6A:
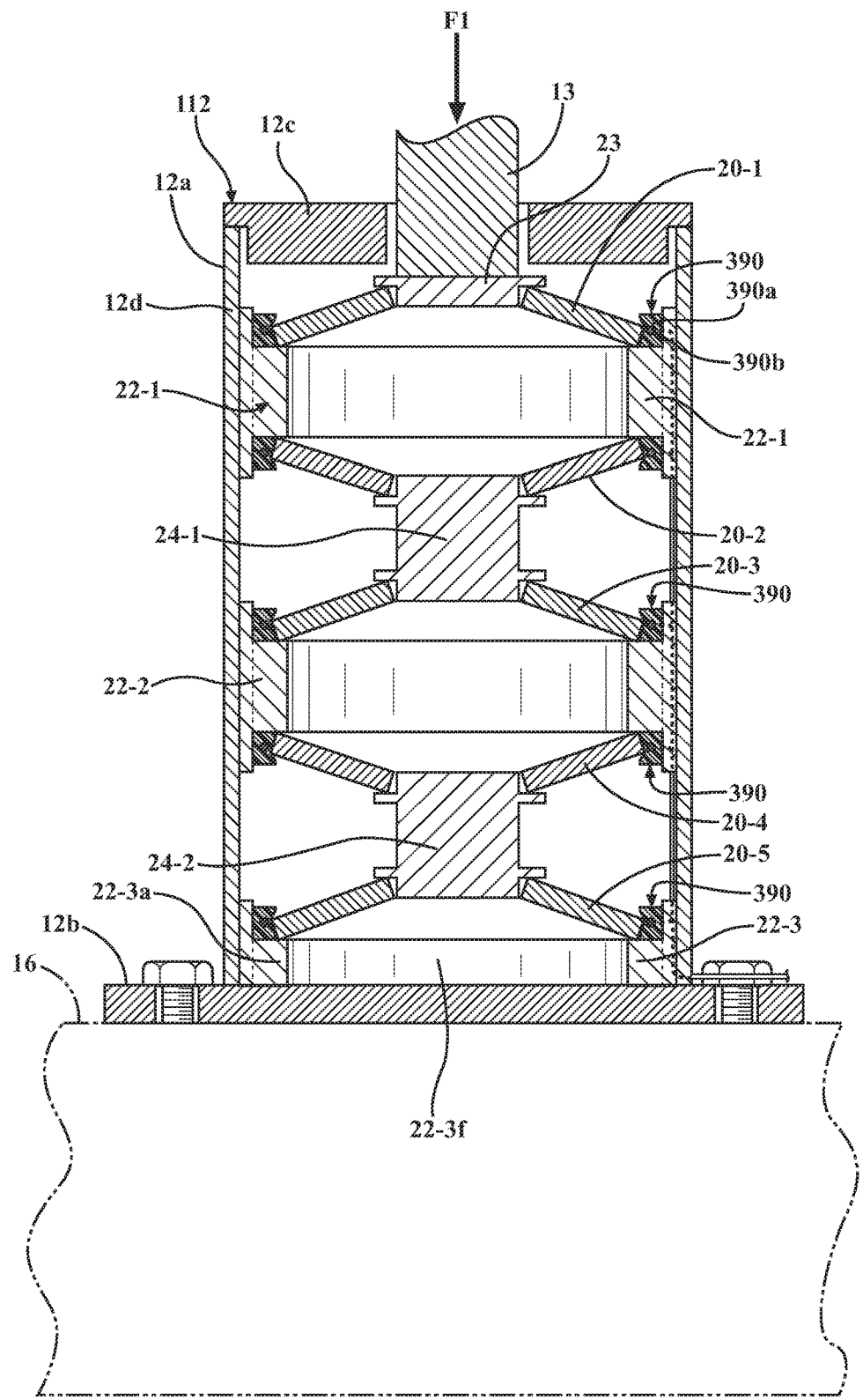
FIG. 6A is a schematic cross-sectional view of the vibration isolator of FIGS. 5A-5C, showing the deflection resistance mechanisms in activated states to provide a relatively lower resistance to conical disc spring member radial deflection, and showing a force F1 applied to the vibration isolator so as to deflect the conical disc spring member arrangement in the isolator.
Figure 6B:
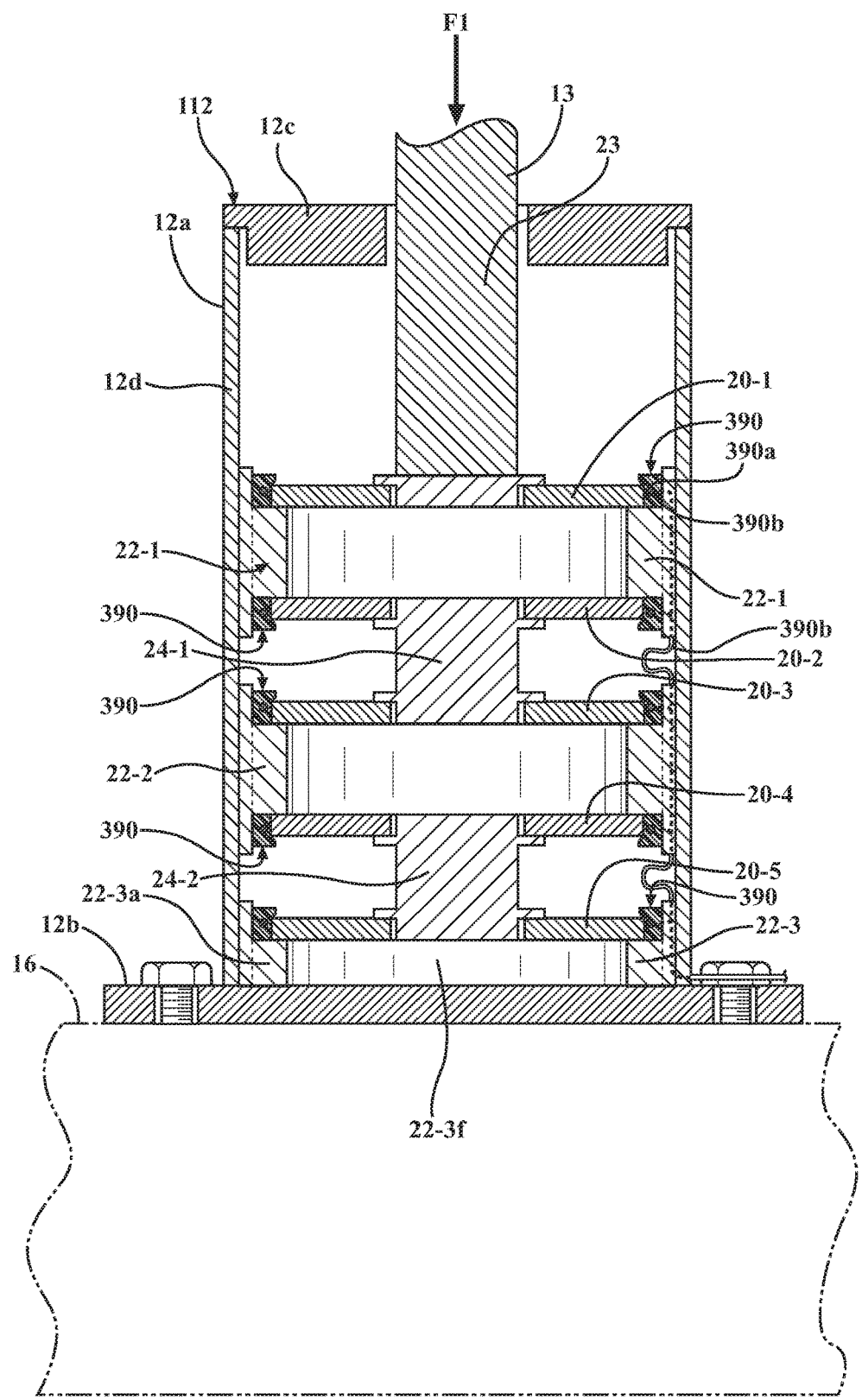
FIG. 6B is the schematic cross-sectional view of FIG. 6A showing the conical disc spring members in the isolator in flattened conditions, responsive to application of a force sufficient to produce a quasi-zero/negative stiffness response of the conical disc spring member arrangement.
Figure 6C:
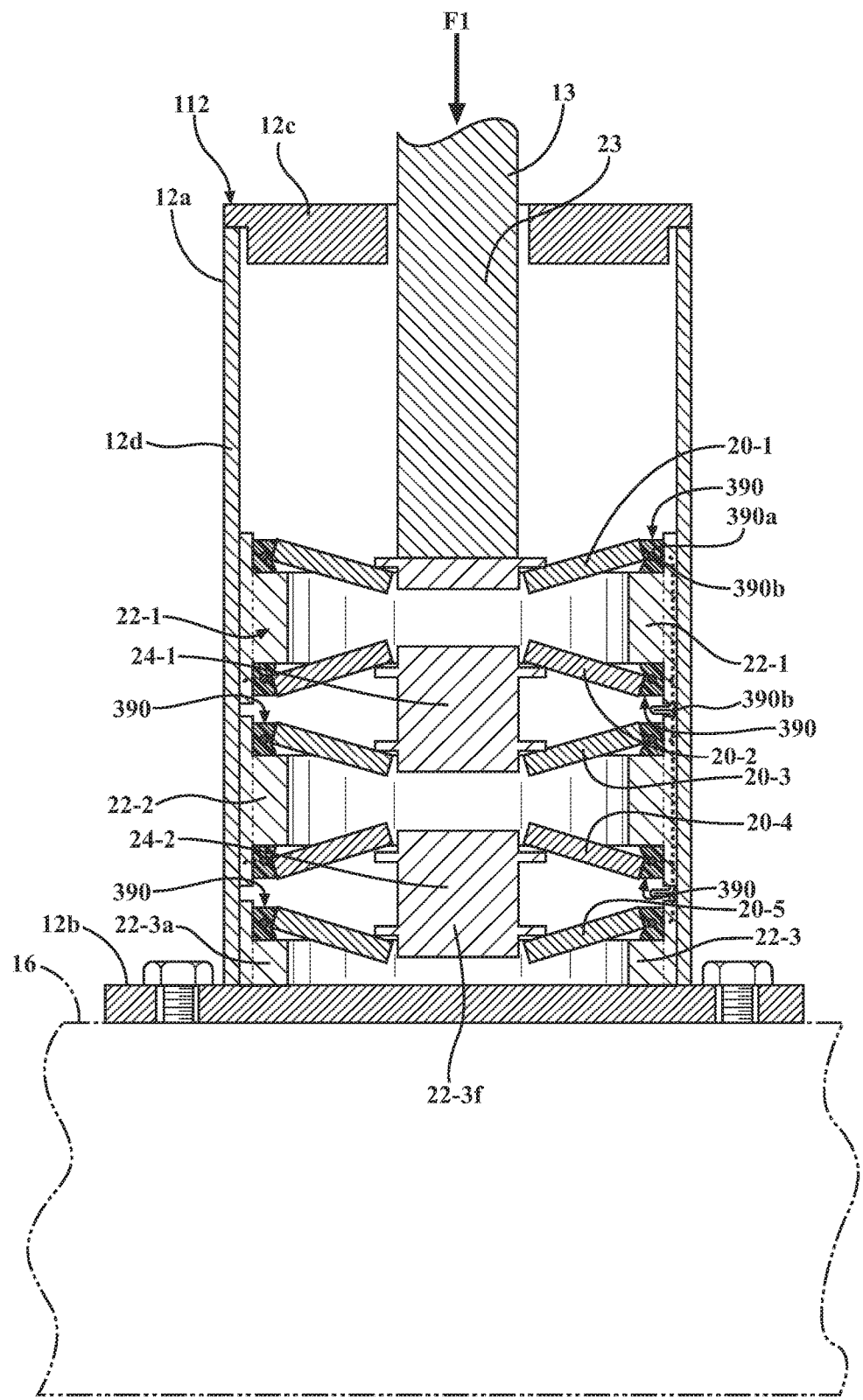
FIG. 6C is the schematic cross-sectional view of FIG. 6A showing the conical disc spring members in the isolator in inverted conditions, responsive to application of a force sufficient exceeding the force needed to produce a quasi-zero/negative stiffness response of the conical disc spring member arrangement.

Referring to FIGS. 6A-6C, when activated by heating, the elastic moduli E of the SMP bearing members 390a are reduced, causing the relatively lower-stiffness bearing members to provide relatively less-resistance force FR to radial movement of the conical spring disc member outer edges in response to isolator loading. The lower elastic moduli may enable the bearing members 390a to deflect or deform as shown in FIGS. 6A-6C responsive to the conical spring disc member deflection when the spring members are loaded. Thus, in the heated condition, the bearing members 390a provide a relatively lower resistance to movement of the conical spring disc member outer edges 925, as the spring members 20 continue to deflect to a relatively flat state (FIG. 6B), then to an inverted state (as shown in FIG. 6C). In this state, the vibration isolator 112 may have a relatively "lower" force-deflection curve similar to curve 602 of FIG. 7, which indicates how the relatively lower resistance to spring member deflection raises the overall level of the force-deflection curve from 601 (no resistance to deflection) to 602 (relatively low resistance to deflection), thereby correspondingly raising the quasi-zero/negative stiffness region over which a quasi-zero/negative stiffness response is provided by the conical disc spring member arrangement, from 601c to 602c. Curve 602 may have a shape and characteristics (including a quasi-zero/negative stiffness response region 602c) similar to those of curves 601 and 603 previously described. Thus, in the state shown in FIGS. 6A-6C, the vibration isolator may provide a quasi-zero/negative stiffness response to applied forces in the force range or zone R1.

Thus, as described above, each bearing member activation mechanism may be operable to control the stiffness of an associated bearing member, so that the bearing member stiffness may be varied between a first stiffness providing a relatively greater resistance to conical disc spring member deflection, and a second stiffness providing a relatively lower resistance to conical disc spring member deflection.

Force-deflection curves for the vibration isolator 112 with the bearing members 390a in both activated and unactivated states may be either specified or determined experimentally and/or analytically during the isolator design phase by test-loading of the isolator and measurement of isolator forces. In one or more arrangements, and as shown in FIG. 7, the force zones R1 and R2 may be designed to overlap to some degree, so as to provide a continuous range of forces over which a quasi-zero/negative stiffness response may be provided. In alternative arrangements, the isolator may be designed so that the force zones R1 and R2 are spaced apart, with no overlap. Thus, it may be seen from FIG. 7 that increasing the resistance to radially-outward movement of the conical disc spring member outer edges has the effect of shifting the isolator assembly force-deflection curve generally upwardly, increasing the force at which quasi-zero/negative response commences and/or increasing the values of the forces in the ranges encompassed by the quasi-zero/negative response zone.

As seen in FIG. 7, the range of forces R2 may be defined from curve 603 in the manner previously described with regard to FIG. 3. For operational purposes, this range of forces may be taken as a range over which the vibration isolator 112 will exhibit a quasi-zero/negative stiffness response when a relatively larger amount of resistance is applied to outer edges of the conical disc spring members during isolator loading by the force F 1. In addition, as seen in FIG. 7, the range of forces R1 may be defined from curve 602 in the manner previously described with regard to FIG. 3. For operational purposes, this range of forces may be taken as a range over which the isolator 12 will exhibit a quasi-zero/negative stiffness response when the relatively smaller amount of resistance is applied to outer edges of the conical disc spring members during isolator loading by the force F1.

FIG. 11 is a schematic cross-sectional view of a spacer structure 122-1 in accordance with an alternative embodiment. Spacer 122-1 may have the same basic structure and components as spacers 22 previously described, and may function in the same manner as spacer 22-1 previously described. In one or more arrangements, all of the spacers 22 may be replaced in the vibration isolator with spacers structured as shown in FIG. 11.

The spacer 122-1 may have a base portion 122-1a with a first side 122-1b and a second side 122-1c opposite the first side 122-1b. The spacer 122-1 may be coupled to a conical disc spring (not shown) as previously described along the base portion first side 122-1b so as to enable transfer of forces between the conical disc spring member and the spacer 122-1.

The base portion first side 122-1b may define a first cavity 122-1d structured to receive therein a second end of a conical disc spring member. The first cavity 122-1d may have a first cavity floor 122-1e. In the embodiment shown, first cavity 122-1d is formed by first cavity floor 122-1e and one or more walls 122-1g extending from the base portion 122-1a. The second end of a conical disc spring member may be positioned in contact with the first cavity floor 122-1e. The first cavity floor 122-1e may also have a first opening 122-1f formed therein and positioned so as to reside opposite a first end of the first conical disc spring member resting on floor 122-1e 20-1 when the second end of the conical disc spring member is in contact with the first cavity floor 122-1e. The first opening 122-1f may be structured to receive at least a portion of the first end of the conical disc spring member therein during an inversion of the first conical disc spring member 20-1 occurring during loading of the first conical disc spring member, as previously described. The opening 122-1f may lead into a through hole as shown in FIG. 11, or the opening may lead into a blind hole cavity extending into the base portion 122-1a to a depth sufficient to enable the conical disc spring member to deflect into the opening and invert without contacting a bottom of the cavity. As shown in FIG. 11, base portion second side 122-1c may have a structure similar to the structure just described for first side 122-1b.

As the second end of the conical disc spring member deflects radially inwardly and outwardly responsive to an axial loading applied to the vibration isolator, the second ends and outer edges of the conical disc spring members may slide radially inwardly and outwardly along the surfaces (such as floor 122-1e) of the spacers with which they are in contact, as previously described.

Base portion 122-1a may be positioned inside an annular shell 122s structured to be slidable or otherwise movable with respect to housing walls 12d during operation of the vibration isolator. Also, in the embodiment shown in FIG. 11, the base portion 122-1a may be formed from an SMP material as previously described. Wires 490b may be molded or otherwise inserted into the base portion walls 122-1g adjacent the floor 122-1e where the conical disc spring members second ends will be positioned. These wires 490b may be powered in the same manner as wires 390b previously described. The resulting heating of the SMP material adjacent the spring member second ends may soften the material, thereby permitting the material to deflect responsive to forces applied by the conical disc spring member outer edges, as previously described. Also, when the SMP material is unheated, the material will provide a relatively greater resistance to movement of the conical disc spring member outer edges, as previously described.

Base portion 122-1 may alternatively be formed from a rigidity-tuning electrically conductive elastomer material as described herein, and may be operable as described herein with regard to the embodiment shown in FIG. 13.

Referring now to FIG. 13, in one or more alternative arrangements, the bearing member 590a may be formed from rigidity-tuning electrically conductive elastomer material, and the bearing member activation mechanism 590b may be in the form of at least one electrically conductive element operatively coupled to the bearing member 590a and structured so as to enable generation of a voltage drop between spaced apart locations in the bearing member. As is known, the elastic modulus E and stiffness of a component formed from this material falls when an electric current is passed through the rigidity-tuning electrically conductive elastomer material. Descriptions of embodiments of such materials are provided in, for example, a paper entitled "Rigidity-Tuning Conductive Elastomer" by Shan et al., *Smart Materials and Structures, Volume* 24, *Number* 6, Published 1 May 2015, by IOP Publishing Ltd., 2015, and which is available at (http://sml.me.cmu.edu/files/papers/shan_sms2015.pdf), which is incorporated herein by reference in its entirety.

FIG. 13 shows an embodiment of a bearing member 590a formed from such a material. A gap 590g may be formed in the annular bearing member 590a to form two spaced apart ends 590a-1 and 590a-2 of the bearing member 590a. A first wire 590b may be electrically connected to the bearing member 590a along a first side of the gap 590g, and a second wire 590c may be electrically connected to the bearing member 590a along a second side of the gap 590g opposite the first side of the gap. This arrangement enables a flow of electric current through the first wire 590b, through the conductive bearing member 590a, then into the second wire 590c. The flow of current may modify the stiffness of the bearing member 590a in the same manner as the wire 390b heats the bearing member 390a as previously described, thereby producing shifts in the force-deflection curve of the vibration isolator as previously described with regard to FIGS. 5A-6C and 7.

Figure 10:
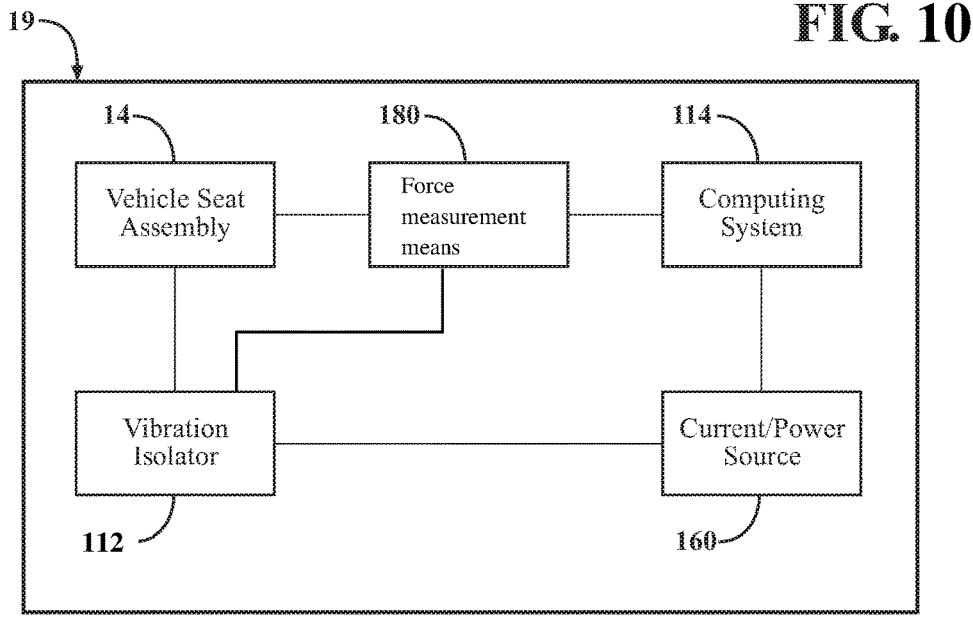
FIG. 10 is a block diagram of a vehicle incorporating a vibration isolator including an embodiment of a conical spring disc member deflection resistance mechanism as described herein.

FIG. 10 is a functional block diagram of a vehicle 19 incorporating a vibration isolator in accordance with an embodiment described herein. The vehicle 19 may include a vibration isolator (such as vibration isolator 112) structured to apply a resistance force to the outer edges of the conical disc spring members in the isolator, as previously described. The vibration isolator 112 may be operatively coupled to a vehicle seat assembly 14 as previously described. The vibration isolator 112 may also be operatively coupled to another portion of the vehicle (such as vehicle chassis 16) (not shown) as previously described.

Referring to FIG. 10, a force measurement means 180 may be operatively coupled to the vibration isolator 112 or to the vehicle seat assembly 14 and may be configured to measure the force F1 applied to the vibration isolator 112 by the vehicle seat assembly. The force measurement means 180 may incorporate suitable acceleration sensor(s), motion sensor(s), or any other suitable sensor(s) or mechanisms usable for determining the force applied to the conical spring disc member arrangement to deflect the disc members.

A current/power source 160 may be operatively coupled to computing system 114 and to the vibration isolator 112. The current/power source 160 may be controllable to supply activation current to the spring member deflection resistance mechanisms 390, to energize the deflection resistance mechanisms as needed.

Figure 9:
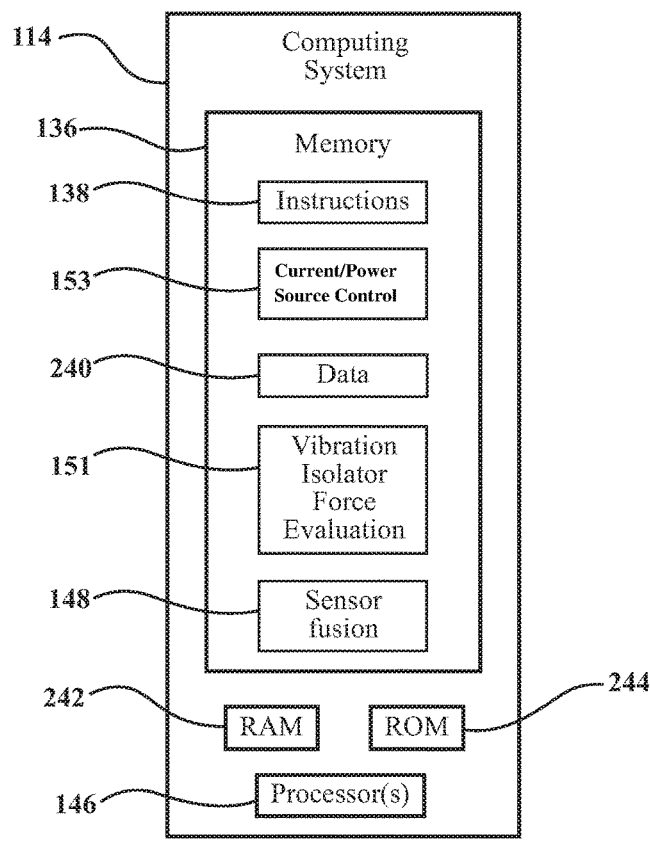
FIG. 9 is a schematic block diagram showing one embodiment of a computing system configured for controlling operation of the conical spring disc member deflection resistance mechanisms.

FIG. 9 is a schematic block diagram showing one embodiment of a computing system 114 configured for controlling the current/power source 160 to energize the deflection resistance mechanisms as needed. Computing system 114 may be operatively coupled to the force measurement means 180. Computing system 114 may be configured to compare the force F1 applied to the vibration isolator 112 with predetermined ranges of forces desired for achieving the quasi-zero/negative deflection response of the vibration isolator. Computing system 114 may be configured to, responsive to this comparison, control the current/power source 160 so as to energize the conical disc spring member deflection resistance mechanisms 390, thereby adjusting the resistance forces applied to the spring members to provide a range of forces over which a quasi-zero/negative stiffness response is provided, and which also encompasses the applied force F1.

The computing system 114 may be operatively connected to the other vehicle systems and elements and may be configured so as to control and operate the vehicle 19 and its components as described herein. The computing system 114 may be configured to control at least some systems and/or components autonomously (without user input) and/or semi-autonomously (with some degree of user input). The computing system may also be configured to control and/or execute certain functions autonomously and/or semi-autonomously. The computing system 114 may additionally or alternatively include components other than those shown and described. The computing system 114 may control the functioning of the vehicle 19 based on inputs and/or information received from various sensors incorporated into the vehicle and other information.

The computing system 114 may have some or all of the elements shown in FIG. 9. In addition, the computing system 114 may include additional components as needed or desired for particular applications. The computing system 114 may also represent or be embodied in a plurality of controllers or computing devices that may process information and/or serve to control individual components or systems of the vehicle 19 in a distributed fashion.

The computing system 114 may include one or more processors 146 (which could include at least one microprocessor) for controlling overall operation of the computing system 114 and associated components, and which execute instructions stored in a non-transitory computer readable medium, such as the memory 136. "Processor" means any component or group of components that are configured to execute any of the processes and/or process steps described herein or any form of instructions to carry out such processes/process steps or cause such processes/process steps to be performed. The processors(s) may control aspects of vehicle operation as described herein in accordance with instructions stored in a memory. The processor(s) 146 may be implemented with one or more general-purpose and/or one or more special-purpose processors. The processor(s) 146 can include at least one hardware circuit (e.g., an integrated circuit) configured to carry out instructions contained in program code. In arrangements in which there is a plurality of processors 146, such processors can work independently from each other or one or more processors can work in combination with each other. In one or more arrangements, the processor(s) 146 can be a main processor of the vehicle 19. For instance, the processor(s) 146 can be part of an electronic control unit (ECU) and can act as a controller in the vehicle 19.

In one or more arrangements, the computing system 114 may include RAM 242, ROM 244, and/or any other suitable form of computer-readable memory. The memory 136 may comprise one or more computer-readable memories. Computer-readable storage or memory 136 includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. The memory 136 can be a component of the computing system 114, or the memory can be operatively connected to the computing system 114 for use thereby. The term "operatively connected," as used throughout this description, can include direct or indirect connections, including connections without direct physical contact.

The memory 136 may contain data 240 and/or instructions 138 (e.g., program logic) executable by the processor(s) 146 to execute various functions of the vehicle 19. The memory 136 may contain additional instructions as well, including instructions to transmit data to, receive data from, interact with, or control one or more of the vehicle systems and/or components described herein (for example, current/power source 160).

Computing system 114 may incorporate a sensor fusion capability 148 configured to combine or integrate data received from different sensors, for further use and/or interpretation by elements of the computing system. Computing system 114 may incorporate a vibration isolator force evaluation capability 151 configured to compare a measured value of the force F1 applied to the vibration isolator 112 to a force at which a quasi-zero/negative stiffness response may be achieved and/or to an range of forces within which a quasi-zero/negative stiffness response may be achieved. Computing system 114 may also incorporate an power source control capability 153 configured for controlling a flow of current to the bearing member activation mechanisms 390b, so as to adjust the bearing member elastic moduli and shift the force-deflection characteristics as described herein.

The various capabilities described herein may be embodied in (and/or executable using) hardware, software, or a combination of hardware and software. Instructions for performing the various capabilities described herein may be stored in a memory. Although several capabilities are explicitly described as being incorporated into the computing system 114, the computing system 114 may also include additional capabilities which may facilitate performance of the functions described herein.

Figure 12:
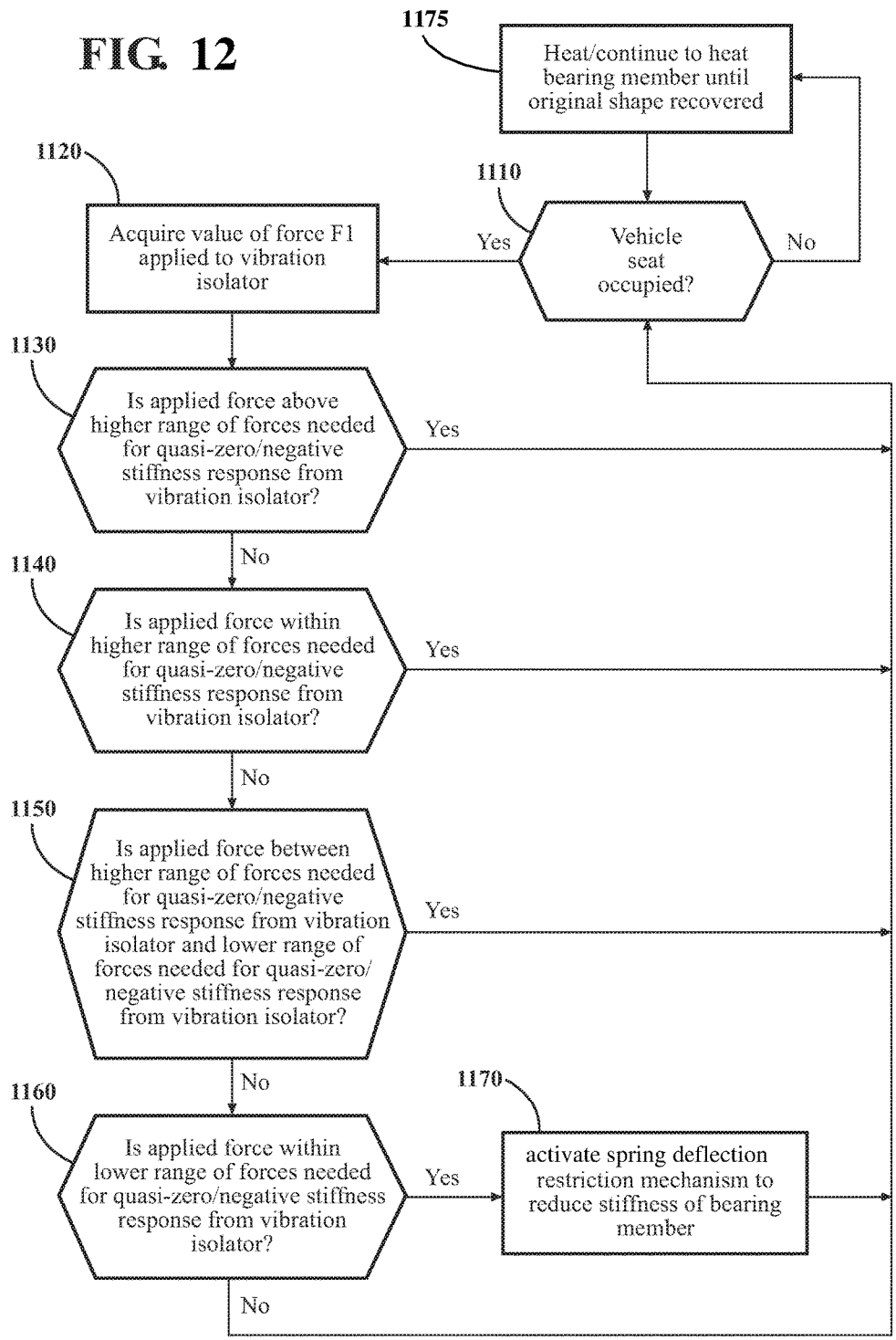
FIG. 12 is a flow diagram illustrating an example of operation of the conical spring disc member deflection resistance mechanisms described herein.

FIG. 12 is a flow diagram illustrating a method of operating the elements shown in FIG. 10 to control the force-deflection characteristics of the vibration isolator 112.

In block 1110, the computing system 114 may determine if the vehicle seat (not shown) of the vehicle seat assembly 14 is occupied. The presence or absence of a seat occupant may be detected and constantly updated using a known seat occupancy sensor (not shown). If it is determined that the seat is unoccupied, in embodiments where the shape memory material forming the bearing members of the resistance mechanisms has been deformed due to deflections of the conical disc spring members during a prior usage of the vibration isolator, and may be returned to an "unactivated" form having a relatively higher elastic modulus, the current/power source 160 may be controlled to heat the bearing members in block 1175 until they have returned to a shape corresponding to an unloaded condition of the vibration isolator. Depending on the particular shape memory material used for the bearing members, this may be involve, for example, supplying current to the energizing wires for a predetermined period of time. Otherwise, when a vehicle occupant sits in a vehicle seat (not shown) of the vehicle seat assembly 14 or a force F1 is otherwise applied to the vibration isolator, the force F1 applied to the vibration isolator 12 is detected by the force measurement means 180 and the magnitude of the force may be transmitted to the computing system 114, wherein control transfers to block 1120.

In block 1120, the computing system may receive or otherwise acquire the force value from the force measurement means 180.

In block 1130, the computing system 114 may compare the applied force detected by force measurement means 180 with a relatively higher range of forces (for example, range R2 as determined from curve 603 of FIG. 7) within which a quasi-zero/negative stiffness response may be achieved for the vibration isolator 112.

If it is determined that the applied force F1 is above the relatively higher predetermined range of forces within which a quasi-zero/negative stiffness response may be achieved, it may not be possible to use the deflection resistance mechanisms to control the force-deflection characteristics of the isolator so as to encompass the applied force F1 within a range of forces providing a quasi-zero/negative stiffness response. Then control may be transferred back to block 1110 where the force measurement means 180 and the computing system continue to monitor the applied force F1 for changes in the force level.

If it is determined that the applied force F1 is not above the relatively higher predetermined range of forces within which a quasi-zero/negative stiffness response may be achieved, the computing system 114 may (in block 1140) determine if the applied force F1 is within the relatively higher predetermined range of forces within which a quasi-zero/negative stiffness response may be achieved.

If the applied force F1 is within the relatively higher predetermined range of forces within which a quasi-zero/negative stiffness response may be achieved, it may not be necessary to adjust the stiffnesses of the bearing members of the isolator deflection resistance mechanisms, because the bearing members will normally reside in unactivated states with relatively higher elastic moduli. Thus, the bearing members should already have the stiffnesses necessary to provide a quasi-zero/negative stiffness response to the applied force F1 in the higher range of forces. Then control may be transferred back to block 1110 where the force measurement means 180 and the computing system continue to monitor the applied force F1 for changes in the force level.

If it is determined that the applied force F1 is not within the relatively higher predetermined range of forces within which a quasi-zero/negative stiffness response may be achieved, the computing system 114 may (in block 1150) determine if the applied force F1 is between the relatively higher predetermined range of forces within which a quasi-zero/negative stiffness response may be achieved, and another, relatively lower range of forces over which a quasi-zero/negative stiffness response may be achieved. This process step may be directed to a condition where the relatively higher range of forces (such as range R2 of FIG. 7) and the relatively lower range of forces (such as range R1 of FIG. 7) do not overlap as shown in FIG. 7.

If the applied force F1 is between the relatively higher predetermined range of forces and the relatively lower predetermined range of forces achievable using the deflection resistance mechanisms, it may not be possible to use the deflection resistance mechanisms to control the force-deflection characteristics of the isolator so as to encompass the applied force F1 within a range of forces providing a quasi-zero/negative stiffness response. Then control may be transferred back to block 1110 where the force measurement means 180 and the computing system continue to monitor the applied force F1 for changes in the force level. However, if the relatively higher range of forces and the relatively lower range of forces overlap as illustrated by ranges R1 and R2 of FIG. 6, and the applied force F1 falls within one of the ranges, it may be possible to control the force-deflection characteristics of the isolator so as to encompass the applied force F1 within a range of forces providing a quasi-zero/negative stiffness response, by either energizing the bearing members (if the applied force F1 is within the lower range of forces) or by leaving the bearing members unenergized (if the applied force F1 is within the higher range of forces). Alternatively, responsive to the applied force falling between the relatively higher and lower ranges of forces, the force-deflection characteristics of the isolator may be controlled to provide a quasi-zero/negative stiffness response to one of the higher range of forces and the lower range of forces.

If the applied force F1 is not between the relatively higher predetermined range of forces and the relatively lower predetermined range of forces achievable using the deflection resistance mechanisms, the computing system 114 may (in block 1160) determine if the applied force F1 is within the relatively lower predetermined range of forces within which a quasi-zero/negative stiffness response may be provided using the deflection resistance mechanisms. If the applied force F1 is not within the relatively lower predetermined range of forces within which a quasi-zero/negative stiffness response may be provided, the applied force F1 may be too low to use the resistance mechanisms to control the force-deflection characteristics of the isolator so as to encompass the applied force F1 within a range of forces providing a quasi-zero/negative stiffness response. Then control may be transferred back to block 1110 where the force measurement means 180 and the computing system continue to monitor the applied force F1 for changes in the force level.

However, if the applied force F1 is within the relatively lower predetermined range of forces within which a quasi-zero/negative stiffness response may be provided, the computing system may operate the current/power source 160 so as to activate or energize the bearing member activation mechanisms to reduce the elastic moduli of the bearing members, thereby lowering the isolator force deflection curve as shown in FIG. 6 such that the applied force F1 is included in the predetermined range of forces within which a quasi-zero/negative stiffness response may be provided.

In the preceding detailed description, reference is made to the accompanying figures, which form a part thereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The various elements of the vibration isolator embodiments described herein may be formed from any material or materials suitable for the purposes described. For example, the conical spring disc members may be formed from a metallic material such as a steel, or any other suitable material. In one or more arrangements, the spacers are formed from a polymer material.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. In the context of this document, a computer-readable storage medium may be any tangible medium that can contain, or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An adjustable vibration isolator structured for limiting transfer of vibrations from a first element to a second element coupled to the first element, the vibration isolator comprising:
at least one conical disc spring member having a first end including a central opening of the at least one conical disc spring member, and a second end opposite the first end, the second end including an outer edge of the at least one conical disc spring member, the at least one conical disc spring member also having a central axis;
at least one spacer coupled to the at least one conical disc spring member so as to enable a transfer of forces between the at least one conical disc spring member and the at least one spacer; and
a spring member deflection resistance mechanism coupled to the at least one spacer and structured to be operable to adjustably resist movement of the outer edge of the at least one conical disc spring member in directions radially outwardly with respect to the central axis during application of a force to the least one conical disc spring member tending to deflect one of the at least one conical disc spring member first end and second end toward the other one of the at least one conical disc spring member first end and second end, so as to control a force required to deflect the one of the at least one conical disc spring member first end and second end toward the other one of the at least one conical disc spring member first end and second end.

2. The adjustable vibration isolator of claim 1 wherein the first element is a vehicle chassis and the second element is a vehicle seat coupled to the vehicle chassis.

3. The adjustable vibration isolator of claim 1 comprising:
a plurality of coaxial conical disc spring members, each spring member of the plurality of spring members having a first end including a central opening of the conical disc spring member, and a second end opposite the first end, the second end including an outer edge of the conical disc spring member, each conical disc spring member also having a central axis;
a spacer coupled to each conical disc spring member of the plurality of the conical disc spring members so as to enable a transfer of forces between the at least one conical disc spring member and the spacer; and
a spring member deflection resistance mechanism coupled to a spacer adjacent each spring member of the plurality of the conical disc spring members and structured to be operable to adjustably resist movement of the outer edge of the spring member of the plurality of the conical disc spring members in directions radially outwardly with respect to the central axis of the spring member during application of a force to the spring member tending to deflect one of the spring member first end and second end toward the other one of the spring member first end and second end, so as to control a force required to deflect the one of the spring member first end and second end toward the other one of the spring member first end and second end.

4. The adjustable vibration isolator of claim 1 wherein the spacer has a base portion including a first side, the base portion first side defining a first cavity structured to receive therein the second end of the at least one conical disc spring member, the first cavity having a first cavity floor, the second end of the at least one conical disc spring member being positioned in contact with the first cavity floor.

5. The adjustable vibration isolator of claim 4 wherein the first cavity floor has a first opening formed therein and structured to receive at least a portion of the first end of the at least one conical disc spring member therein during an inversion of the at least one conical disc spring member during loading of the at least one conical disc spring member.

6. The adjustable vibration isolator of claim 5 further comprising at least one additional conical disc spring member positioned adjacent the at least one conical disc spring member, the at least one additional conical disc spring member having a first end including a central opening of the conical disc spring member, and a second end opposite the first end, wherein the at least one spacer is interposed between the at least one conical disc spring member and the at least one additional conical disc spring member, the at least one spacer base portion also having a second side, the base portion second side defining a second cavity structured to receive therein the second end of the at least one additional conical disc spring member, the second cavity having a second cavity floor, the second end of the at least one additional conical disc spring member being positioned in contact with the second cavity floor, the second cavity floor including a second opening formed therein and positioned so as to reside opposite the first end of the at least one additional conical disc spring member when the second end of the at least one additional conical disc spring member is in contact with the second cavity floor, the second opening being structured to receive at least a portion of the first end of the at least one additional conical disc spring member therein during an inversion of the at least one additional conical disc spring member during loading of the at least one additional conical disc spring member.

7. The adjustable vibration isolator of claim 6 wherein the at least one conical disc spring member and the at least one additional conical disc spring member are arranged in a series configuration.

8. The adjustable vibration isolator of claim 4 further comprising a housing having a first end, a second end opposite the first end, and at least one wall extending between the housing first and second ends, the housing first end, housing second end, and at least one wall defining an interior of the housing, wherein the at least one spacer includes a base portion structured to be slidable along the at least one wall of the housing, and wherein the spring member deflection resistance mechanism is coupled to the spacer base portion and structured such that at least a portion of the spring member deflection resistance mechanism extends between the at least one housing wall and the at least one conical disc spring member outer edge.

9. The adjustable vibration isolator of claim 8 wherein a portion of the spacer base portion extends between the bearing member and the at least one housing wall.

10. The adjustable vibration isolator of claim 1 wherein the spring member deflection resistance mechanism comprises:
    a bearing member structured to apply an adjustable resistance force to the outer edge of the at least one conical disc spring member responsive to a force applied to the bearing member by the at least one conical disc spring member; and
    and a bearing member activation mechanism operatively coupled to the bearing member and structured to be operable to control a stiffness of the bearing member.

11. The adjustable vibration isolator of claim 10 wherein the bearing member is formed from a shape memory polymer material, and wherein the bearing member activation mechanism comprises an electrically conductive heating element positioned in physical contact with the bearing member so as to enable heating of a portion of the bearing member in contact with the outer edge of the at least one conical disc spring member.

12. The adjustable vibration isolator of claim 10 wherein the bearing member is formed from rigidity-tuning electrically conductive elastomer material, and wherein the bearing member activation mechanism comprises at least one electrically conductive element operatively coupled to the bearing member and structured so as to enable generation of a voltage drop between spaced apart locations in the bearing member.

13. A method of controlling a force-deflection response of a vibration isolator to an applied load, the method comprising steps of:
    providing a vibration isolator incorporating an arrangement of conical disc spring members structured to provide a quasi-zero/negative force-deflection response of the isolator to a force applied to the vibration isolator when the applied force is within a predetermined range or forces;
    providing one or more spring member deflection resistance mechanisms structured to be operable to adjustably resist deflection of each conical disc spring member during application of the force to the vibration isolator by electrically controlling a stiffness of at least a portion of the one or more spring member deflection resistance mechanisms, so as to control the range of forces over which the arrangement of conical disc spring members provides the quasi-zero/negative force-deflection response; and
    responsive to a magnitude of the applied force, operating the one or more spring member deflection resistance mechanisms to resist deflection of the spring members during application of the force to the vibration isolator so as to control the range of forces over which the arrangement of conical disc spring members provides the quasi-zero/negative force-deflection response, such that the magnitude of the applied force is within the range of forces.

14. The method of claim 13 wherein each conical disc spring member of the arrangement of conical disc spring members has a first end including a central opening of the first conical disc spring member, and a second end opposite the first end, the second end including an outer edge of the conical disc spring member, each conical disc spring member also having a central axis, and wherein each of the one or more spring member deflection resistance mechanisms is structured to be operable to adjustably resist movement of the outer edge of at least one associated conical disc spring member of the arrangement of conical disc spring members in directions radially outwardly with respect to the central axis of the at least one associated conical disc spring member, during application of a force to the least one associated conical disc spring member tending to deflect one of the first end and the second end of the at least one associated conical disc spring member toward the other one of the first end and the second end of the associated at least one conical disc spring member.

15. The method of claim 14 wherein each of the one or more spring member deflection resistance mechanisms comprises:
    a bearing member structured to apply an adjustable resistance force to the outer edge of the at least one associated conical disc spring member of the arrangement of conical disc spring members responsive to a force applied to the bearing member by the at least one associated conical disc spring member; and
    a bearing member activation mechanism operatively coupled to the bearing member and structured to be operable to control a stiffness of the bearing member, so as to adjust the applied resistance force.

16. The method of claim 15 wherein each bearing member activation mechanism is operable to control a stiffness of the bearing member so as to provide one of a first stiffness of the bearing member and a second stiffness of the bearing member such that the vibration isolator provides the quasi-zero/negative force-deflection response to an applied force within a first range of forces when a stiffness of each bearing member is controlled to the first stiffness, and the vibration isolator provides the quasi-zero/negative force-deflection response to an applied force within a second range of forces when the stiffness of each bearing member is controlled to the second stiffness.

17. The method of claim 16 wherein the first range of forces and the second range of forces overlap.

* * * * *